United States Patent
Shaabani et al.

(10) Patent No.: US 11,126,679 B2
(45) Date of Patent: Sep. 21, 2021

(54) SYSTEMS AND METHODS FOR DETECTING PATHOGENIC SOCIAL MEDIA ACCOUNTS WITHOUT CONTENT OR NETWORK STRUCTURE

(71) Applicant: Arizona Board of Regents on Behalf of Arizona State University, Tempe, AZ (US)

(72) Inventors: Elham Shaabani, Tempe, AZ (US); Paulo Shakarian, Tempe, AZ (US); Hamidreza Alvari, Tempe, AZ (US); Ruocheng Guo, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 123 days.

(21) Appl. No.: 16/968,499

(22) PCT Filed: Feb. 8, 2019

(86) PCT No.: PCT/US2019/017287
§ 371 (c)(1),
(2) Date: Aug. 7, 2020

(87) PCT Pub. No.: WO2019/157335
PCT Pub. Date: Aug. 15, 2019

(65) Prior Publication Data
US 2020/0410028 A1    Dec. 31, 2020

Related U.S. Application Data

(60) Provisional application No. 62/628,196, filed on Feb. 8, 2018.

(51) Int. Cl.
*G06F 15/16*     (2006.01)
*G06F 16/9536*   (2019.01)
(Continued)

(52) U.S. Cl.
CPC ........ *G06F 16/9536* (2019.01); *G06F 21/564* (2013.01); *H04L 51/32* (2013.01); *H04L 67/306* (2013.01)

(58) Field of Classification Search
CPC ... G06F 16/9536; G06F 21/564; H04L 51/32; H04L 67/306
(Continued)

(56) References Cited

U.S. PATENT DOCUMENTS

| 8,955,127 B1 | 2/2015 | Sokolov |
| 9,292,885 B2 | 3/2016 | Astore |

(Continued)

FOREIGN PATENT DOCUMENTS

WO     2019089389 A1     5/2019

OTHER PUBLICATIONS

H. Allcott and M. Gentzkow, "Social media and fake news in the 2016 election," National Bureau of Economic Research, Tech. Rep., 2017. Research,.

(Continued)

*Primary Examiner* — Kaylee J Huang
(74) *Attorney, Agent, or Firm* — Polsinelli PC

(57) ABSTRACT

Embodiments of a system and methods for detecting social media designed to spread malicious information to "viral" proportions are disclosed. Historical cascade event data from preselected social media accounts as well as information from related accounts is applied to one or more causality metrics to generate a set of causality values. Causality values are further refined and analyzed to determine how casual a user is with respect to a cascade as opposed to other similar users.

19 Claims, 20 Drawing Sheets
(14 of 20 Drawing Sheet(s) Filed in Color)

(51) Int. Cl.
    *G06F 21/56* (2013.01)
    *H04L 29/08* (2006.01)
    *H04L 12/58* (2006.01)
(58) Field of Classification Search
    USPC .................................................. 709/206, 217
    See application file for complete search history.

(56) References Cited

U.S. PATENT DOCUMENTS

| | | | |
|---|---|---|---|
| 10,078,750 B1* | 9/2018 | Oliver | H04L 51/32 |
| 10,176,438 B2 | 1/2019 | Shakarian et al. | |
| 10,313,385 B2 | 6/2019 | Shakarian et al. | |
| 10,437,945 B2 | 10/2019 | Shakarian et al. | |
| 2014/0280610 A1 | 9/2014 | Chen et al. | |
| 2014/0304343 A1 | 10/2014 | Skiba et al. | |
| 2016/0119364 A1* | 4/2016 | Zolli | G06Q 50/01 726/26 |
| 2017/0286671 A1 | 10/2017 | Chari et al. | |
| 2018/0077251 A1* | 3/2018 | Shalita | G06F 16/337 |
| 2019/0124109 A1* | 4/2019 | Foster | G06F 40/174 |
| 2019/0347327 A1 | 11/2019 | Patil et al. | |
| 2019/0349393 A1 | 11/2019 | Nunes et al. | |
| 2020/0036743 A1 | 1/2020 | Almukaynizi et al. | |

OTHER PUBLICATIONS

C. Chen, K. Wu, V. Srinivasan, and X. Zhang, "Battling the internet water army: Detection of hidden paid posters," in Advances in Social Networks Analysis and Mining, 2013 IEEE/ACM International Conference on, 2013, pp. 116-120.

C. Chen, K. Wu, V. Srinivasan, and K. Bharadwaj, "The best answers? think twice: online detection of commercial campaigns in the cqa forums," in Advances in Social Networks Analysis and Mining, 2013 IEEE/ACM International Conference on, 2013, pp. 458-465.

K. Wang, Y. Xiao, and Z. Xiao, "Detection of internet water army in social network," in 2014 International Conference on Computer, Communications and Information Technology (CCIT 2014). Atlantis Press, 2014.

A. Gupta, H. Lamba, and P. Kumaraguru, "$1.00 per rt# bostonmarathon# prayforboston: Analyzing fake content on twitter," in eCrime Researchers Summit (eCRS), 2013. IEEE, 2013, pp. 1-12.

C. Kang, "Fake news onslaught targets pizzeria as nest of childtrafficking," The New York Times, 2016.

F. Morstatter, L. Wu, T. H. Nazer, K. M. Carley, and H. Liu, "A new approach to bot detection: striking the balance between precision and recall," in Advances in Social Networks Analysis and Mining, 2016 IEEE/ACM International Conference on, 2016, pp. 533-540.

Q. Cao, M. Sirivianos, X. Yang, and T. Pregueiro, "Aiding the detection of fake accounts in large scale social online services," in Proceedings of the 9th USENIX conference on Networked Systems Design and Implementation. USENIX Association, 2012, pp. 15-15.

V. Subrahmanian, A. Azaria, S. Durst, V. Kagan, A. Galstyan, K. Lerman, L. Zhu, E. Ferrara, A. Flammini, and F. Menczer, "The darpa twitter bot challenge," Computer, vol. 49, No. 6, pp. 38-46, 2016.

C. A. Davis, O. Varol, E. Ferrara, A. Flammini, and F. Menczer, "Botornot: A system to evaluate social bots," in Proceedings of the 25th International Conference Companion on World Wide Web. International World Wide Web Conferences Steering Committee, 2016, pp. 273-274.

J. P. Dickerson, V. Kagan, and V. Subrahmanian, "Using sentiment to detect bots on twitter: Are humans more opinionated than bots?" in Advances in Social Networks Analysis and Mining, 2014 IEEE/ACM International Conference on, 2014, pp. 620-627.

S. Kleinberg and B. Mishra, "The temporal logic of causal structures," in Proceedings of the Twenty-Fifth Conference on Uncertainty in Artificial Intelligence, 2009, pp. 303-312.

A. Goyal, F. Bonchi, and L. V. Lakshmanan, "Learning influence probabilities in social networks," in Proceedings of the third ACM international conference on Web search and data mining. ACM, 2010, pp. 241-250.

X. Zhu and Z. Ghahramani, "Learning from labeled and unlabeled data with label propagation," 2002.

S. Baluja, R. Seth, D. Sivakumar, Y. Jing, J. Yagnik, S. Kumar, C. Ravichandran, and M. Aly, "Video suggestion and discovery for youtube: taking random walks through the view graph," in Proceedings of the 17th international conference on World Wide Web. ACM, 2008, pp. 895-904.

U. N. Raghavan, R. Albert, and S. Kumara, "Near linear time algorithm to detect community structures in large-scale networks," Physical review E, vol. 76, No. 3, p. 036106, 2007.

N. Kim, S. Gokalp, H. Davulcu, and M. Woodward, "Lookingglass: A visual intelligence platform for tracking online social movements," in Proceedings of International Symposium on Foundation of Open Source Intelligence and Security Informatics (FOSINT-SI), in conjunction with IEEE ASONAM 2013. ACM, 2013.

M Benigni and K. M. Carley, "From tweets to intelligence: Understanding the islamic jihad supporting community on twitter."

M Abokhodair, D. Yoo, and D. W. McDonald, "Dissecting a social botnet: Growth, content and influence in twitter," in Proceedings of the 18th ACM Conference on Computer Supported Cooperative Work & Social Computing. ACM, 2015, pp. 839-851.

S. Al-khateeb and N. Agarwal, "Examining botnet behaviors for propaganda dissemination: A case study of isil's beheading videosbased propaganda," in Data Mining Workshop, 2015 IEEE International Conference on, 2015, pp. 51-57.

Zhang, X.; Zhu, J.; Wang, Q.; and Zhao, H. 2013. Identifying influential nodes in complex networks with community structure. Know.-Based Syst. 42.

Benigni, M. C.; Joseph, K.; and Carley, K. M. 2017. Online extremism and the communities that sustain it: Detecting the isis supporting community on twitter. PloS one.

Bessi, A., and Ferrara, E. 2016. Social bots distort the 2016 US presidential election online discussion. First Monday 21(11).

Blondel, V. D.; Guillaume, J.-L.; Lambiotte, R.; and Lefebvre, E. 2008. Fast unfolding of communities in large networks. Journal of Statistical Mechanics: Theory and Experiment.

Cao, Q.; Yang, X.; Yu, J.; and Palow, C. 2014. Uncovering large groups of active malicious accounts in online social networks. In CCS.

Cui, P.; Jin, S.; Yu, L.; Wang, F.; Zhu, W.; and Yang, S. 2013. Cascading outbreak prediction in networks: A data-driven approach. In KDD.

Ferrara, E. 2017. Disinformation and social bot operations in the run up to the 2017 French presidential election.

Fu, Yu-Hsiang, H. C.-Y., and Sun, C.-T. 2015. Identifying superspreader nodes in complex networks. Mathematical Problems in Engineering.

Green, T., and Spezzano, F. 2017. Spam users identification in wikipedia via editing behavior. ICWSM.

Guo, R.; Shaabani, E.; Bhatnagar, A.; and Shakarian, P. 2016. Toward early and order-of-magnitude cascade prediction in social networks. Social Network Analysis and Mining.

Gupta, A.; Kumaraguru, P.; Castillo, C.; and Meier, P. 2014. TweetCred: Real-Time Credibility Assessment of Content on Twitter. Springer International Publishing.

Kollanyi, B., Howard, P. N., Woolley, S.C., 2016. Bots and automation over twitter during the US election.

Kempe, D.; Kleinberg, J.; and Tardos, E. 2003. Maximizing the spread of influence through a social network. In KDD.

Wu, L.; Hu, X.; Morstatter, F.; and Liu, H. 2017. Adaptive spammer detection with sparse group modeling. ICWSM.

Klausen, J.; Marks, C.; and Zaman, T. 2016. Finding online extremists in social networks. CoRR abs/1610.06242.

Zhu, K., and Ying, L. 2016. Information source detection in the sir model: A sample-path-based approach. IEEE/ACM Trans. Netw. 24(1).

Kleinberg, S. 2011. A logic for causal inference in time series with discrete and continuous variables. In IJCAI.

(56) References Cited

OTHER PUBLICATIONS

Konishi, T.; Iwata, T.; Hayashi, K.; and Kawarabayashi, K.-I. 2016. Identifying key observers to find popular information in advance. In IJCAI.

Lee, S., and Kim, J. 2014. Early filtering of ephemeral malicious accounts on twitter. Comput. Commun.

Nilizadeh, S.; Labreche, F.; Sedighian, a.; Zand, A.; Fernandez, J. M.; Kruegel, C.; Stringhini, G.; and Vigna, G. 2017. POISED spotting twitter spam off the beaten paths. CoRR abs/1708.09058.

Pei, S.; Muchnik, L.; Jr., J. S. A.; Zheng, Z.; and Makse, H. A. 2014. Searching for superspreaders of information in rea-world social media. CoRR.

Shao, C.; Ciampaglia, G. L.; Varol, O.; Flammini, A.; and Menczer, F. 2017. The spread of fake news by social bots. arXiv preprint arXiv:1707.07592.

Stanton, A.; Thart, A.; Jain, A.; Vyas, P.; Chatterjee, A.; and Shakarian, P. 2015. Mining for causal relationships: A data-driven study of the islamic state. CoRR abs/1508.01192.

Varol, O.; Ferrara, E.; Davis, C. A.; Menczer, F.; and Flammini, A. 2017a. Online human-bot interactions: Detection, estimation, and characterization. ICWSM.

Varol, O.; Ferrara, E.; Menczer, F.; and Flammini, A. 2017b. Early detection of promoted campaigns on social media. EP J Data Science.

Volkova, S., and Bell, E. 2017. Identifying effective signals to predict deleted and suspended accounts on twitter across languages. ICWSM.

Weng, L.; Menczer, F.; and Ahn, Y.-Y. 2014. Predicting successful memes using network and community structure. In ICWSM.

International Search Report and Written Opinion issued in corresponding Application No. PCT/US2019/017287 on Apr. 26, 2019, 10 pages.

U.S. Appl. No. 16/653,899, filed Oct. 15, 2019, Sarkar et al.
U.S. Appl. No. 16/875,540, filed May 15, 2020, Nunes.
U.S. Appl. No. 16/640,878, filed Feb. 21, 2020, Shakarian et al.
U.S. Appl. No. 16/548,329, filed Aug. 22, 2020, Tavabi et al.

\* cited by examiner (a) $\epsilon_{K\&M} \geq 0.5$ (b) $\epsilon_{rel} \geq 2$ (c) $\epsilon_{nb} \geq 0.5$ (d) $\epsilon_{wnb} \geq 0.5$

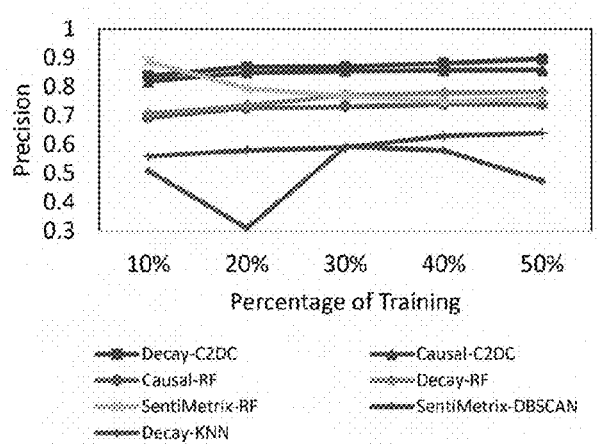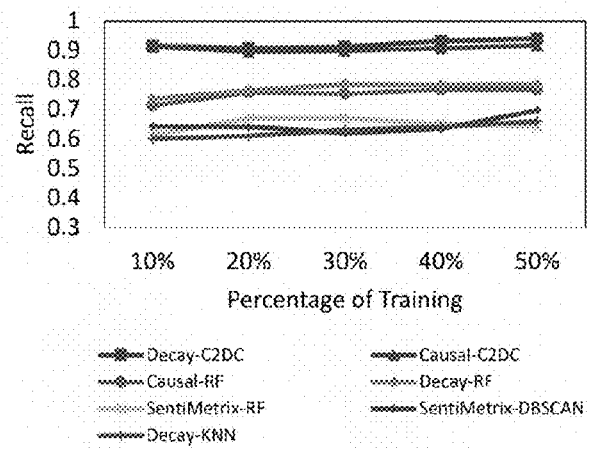
FIG. 14A                FIG. 14B
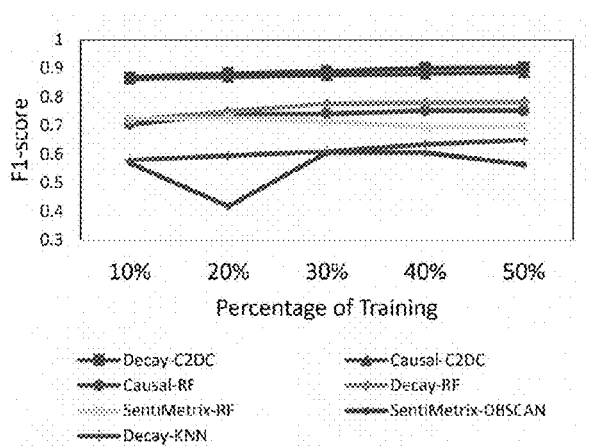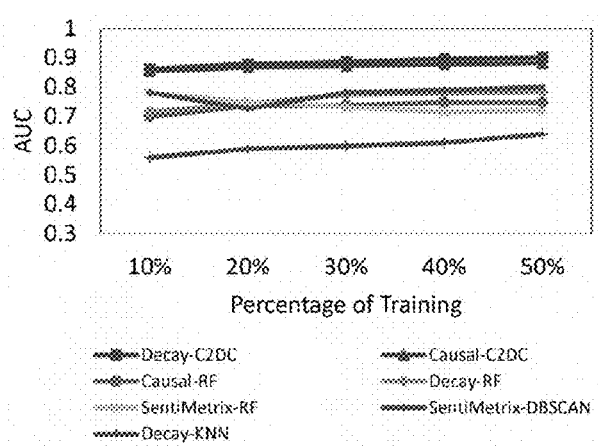
FIG. 15A                FIG. 15B

SYSTEMS AND METHODS FOR DETECTING PATHOGENIC SOCIAL MEDIA ACCOUNTS WITHOUT CONTENT OR NETWORK STRUCTURE

CROSS REFERENCE TO RELATED APPLICATIONS

This is a PCT application that claims benefit to U.S. provisional application Ser. No. 62/628,196 filed on Feb. 8, 2018 which is incorporated by reference in its entirety.

FIELD

The present disclosure generally relates to identifying pathogenic social media accounts, and in particular to systems and methods for detecting pathogenic social media accounts without leveraging network structure, cascade path information, content, or user's information.

BACKGROUND

The spread of harmful misinformation in social media is a pressing problem. Social media accounts that have the capability of spreading such information to viral proportions are referred to as "Pathogenic Social Media" (PSM) accounts. These accounts can include terrorist supporter accounts, water armies, and fake news writers. In addition, these organized groups/accounts spread messages regarding certain topics. Such accounts might be operated by multiple people that tweet/retweet through multiple accounts to promote/degrade an idea, which can influence public opinion. As such, identifying PSM accounts has important applications to countering extremism, the detection of water armies, and fake news campaigns. In Twitter, many of these accounts have been found to be social bots. The PSM accounts that propagate information are key to a malicious information campaign and detecting such accounts is critical to understanding and stopping such campaigns. However, this is difficult in practice. Existing methods rely on social media message content (e.g. text, image, video, audio, hashtag, URL, or user mentions, etc.), social media user profile information (e.g. user name, photo, URL, number of tweets/retweets, location, etc.), social or network structure (e.g. number of followers, number of followees, actual list of followers, actual list of followees, number of friends, actual friends list, betweenness centrality, pagerank centrality, closeness centrality, and in-degree and out-degree centralities, star and clique networks associated with users, average clustering coefficients of each user, etc.), or combinations thereof. However, reliance on information of this type leads to two challenges. First, collection, storage, and processing of message content, user profile, and/or network structure requires significantly more computing CPU, memory, and network bandwidth. Second, the use of content often necessitates the training of a new model for previously unobserved topics. For example, PSM accounts taking part in elections in the U.S. and Europe will likely leverage different types of content. Third, network structure information is not always available. For example, the FACEBOOK® API does not make this information available without permission of the users (which is likely a non-starter for identifying PSM accounts).

Early detection of PSM accounts is critical as these accounts are likely to be key users related to the formation of harmful malicious information campaigns. This is a challenging task for social media authorities for three reasons. First, it is not always easy to manually shut down these accounts. Despite efforts to suspend these accounts, many of them simply return to social media with different accounts. Second, for the most part, the available data is imbalanced and social network structure, which is at the core of many techniques are not readily available. Third, PSM accounts often seek to utilize and cultivate large number of online communities of passive supporters to spread as much harmful information as they can. Consequently, extra efforts need to be dedicated to proposing capabilities that could be deployed by social network firms to counter PSM accounts, regardless of the underlying social network platform.

It is with these observations in mind, among others, that various aspects of the present disclosure were conceived and developed.

BRIEF DESCRIPTION OF THE DRAWINGS

The patent or application file contains at least one drawing executed in color. Copies of this patent or patent application with color drawing(s) will be provided by the Office by request and payment of the necessary fee.

FIGS. 14A-14B are graphical representations showing the precision and recall for each classifier, according to aspects of the present disclosure;

FIGS. 15A-15B are graphical representations showing the F1 score and AUC results for each classifier, according to aspects of the present disclosure.

Corresponding reference characters indicate corresponding elements among the view of the drawings. The headings used in the figures do not limit the scope of the claims.

DETAILED DESCRIPTION

General Description of Invention

Figure 1A:
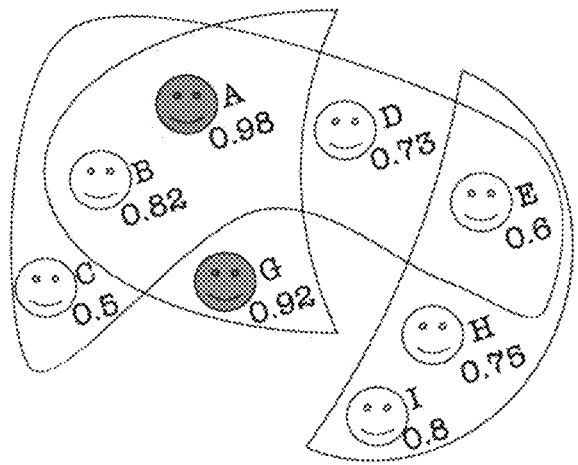
FIGS. 1A-1D show a hypergraph of three cascades, according to aspects of the present disclosure.

As described herein, addressing the viral spread of misinformation poses various technical problems. For example, some technologies may rely upon social media message content, social media user profile information, social structure, or combinations thereof and therefore require excess computing power, memory, and network bandwidth. The present novel concept provides a technical solution to these technical problems by defining a sophisticated computational framework that determines how causal a user is with respect to a cascade by comparison to others using historical cascade event data. The concept further differs from previous approaches by focusing on malicious social media accounts that make messages "go viral". The framework may supplement but does not require the analysis of social media message content, social media user profile information, or social to identify PSM accounts. Rather, the concept relies primarily on the evaluation of how likely a given social media account is to cause a message to spread virally. Thus, the present disclosure involves significantly less CPU, memory, and network bandwidth, and at the same time, provides a more accurate and efficient system for detecting malicious accounts. Further, because the concept does not rely upon social media content, it can potentially detect pathogenic social media accounts used to spread new types of malicious information where the content has differed greatly from training data. This approach is potentially complementary to content based methods.

Technical Approach

Technical Preliminaries

Throughout this disclosure cascades shall be represented as an "action log" (Actions) of tuples where each tuple (u, m, t)∈Actions corresponds with a user u∈U posting message m∈M at time t ∈ T. It is assumed that set M includes posts/repost of a certain original tweet or message. For a given message, the first occurrence of each user is only considered. The present disclosure defines Actions$_m$ as a subset of Actions for a specific message m. Formally, it is defined as Actions$_m$={(u', m', t')∈Actions s.t. m'=m}.

Definition 1. (m-participant). For a given m∈M, user i is an m-participant if there exists t such that (i, m, t)∈Actions.

Note that the users posting tweet/retweet in the early stage of cascades are the most important ones since they play a significant role in advertising the message and making it viral. For a given m∈M, an m-participant i "precedes" m-participant j if there exists t<t' where (i, m, t), (j, m, t')∈Actions. Thus, key users are defined as a set of users adopting a message in the early stage of its life span. These users appear in the "beginning" of a cascade, before specified users join the cascade. The present disclosure defines key user as follows:

Definition 2. (Key User). For a given message m, m-participant i, and Actions$_m$, wherein user i is a key user iff user i precedes at least $\phi$ fraction of m-participants (formally: |Actions$_m$|×$\phi$≤|{j|∃t':(j, m, t') ∈Actions$_m$ ∧t'>t}|, (i, m, t)∈Actions$_m$), where $\phi$ ∈(0, 1).

The notation |·| denotes the cardinality of a set. All messages are not equally important. That is, only a small portion of them become popular. These viral messages are defined as follows:

Definition 3. (Viral Messages). For a given threshold θ, a message m∈M is viral iff |Actions$_m$|≥θ. M$_{vir}$ is used to denote the set of viral messages.

The Definition 3 allows the computation of the prior probability of a message (cascade) going viral as follows:

$$p = \frac{|M_{vir}|}{|M|} \quad (1)$$

The probability of a cascade m going viral given some user i was involved is defined as:

$$p_{m|i} = \frac{|\{m \in M_{vir} \text{ s.t. } i \text{ is a key user}\}|}{|\{m \in M \text{ s.t. } i \text{ is a key user}\}|} \quad (2)$$

The present disclosure is also concerned with two other measures. First, the probability that two users i and j tweet or retweet viral post m chronologically, and both are key users. In other words, these two users are making post m viral.

$$p_{i,j} = \frac{|\{m \in M_{vir} \mid \exists\, t, t' \text{ where } t < t' \text{ and } (i, m, t), (j, m, t') \in \text{Actions}\}|}{|m \in M | \exists\, t, t' \text{ where } (i, m, t), (j, m, t') \in \text{Actions}|} \quad (3)$$

Second, the probability that key user j tweets/retweets viral post m and user i does not tweet/retweet earlier than j. In other words, only user j is making post m viral.

$$p_{-i,j} = \quad (4)$$

$$\frac{|\{m \in M_{vir} \mid \exists\, t' \text{ s.t. } (j, m, t') \in \text{Actions and } \not\exists t \text{ where } t < t', (i, m, t), (j, m, t') \in \text{Actions}\}|}{|\{m \in M \mid \exists\, t' \text{ s.t. } (j, m, t') \in \text{Actions and } \not\exists t \text{ where } t < t', (i, m, t) \in \text{Actions}\}|}$$

Knowing the action log, the aim is to find a set of pathogenic social media (PSM) accounts. These users are associated with the early stages of large information cascades and, once detected, are often deactivated by a social media firm. In the causal framework disclosed herein, a series of causality-based metrics is introduced for identifying PSM users.

Causal Framework

The present disclosure adopts a causal inference framework. In particular, the present disclosure expands upon the causal inference framework in two ways: (1) the casual framework addresses the problem of identifying PSM accounts; and (2) the present disclosure extends this single causal metric to a set of metrics. Multiple causality measurements provide a stronger determination of significant causality relationships. For a given viral cascade, the casual framework seeks to identify potential users who likely caused the cascade to go viral. An initial set of criteria is first required for such a causal user. This is done by instantiating the notion of Prima Facie causes to our particular use case below:

Definition 4. (Prima Facie Causal User). A user u is a prima facie causal user of cascade m iff: User u is a key user of m, $m \in M_{vir}$, and $p_{m|u} > \rho$.

For a given cascade m, the language prima facie causal user will often be used to describe user i as a prima facie cause for m to be viral. In determining if a given prima facie causal user is causal, other "related" users must be considered. In this disclosure, i and j are m-related if (1.) i and j are both prima facie causal users form, (2.) i and j are both key users form, and (3.) i precedes j. Hence, the set of "related users" for user i (denoted R(i)) are defined as follows:

$$R(i) = \{j \text{ s.t. } j \neq i, \exists m \in M \text{ s.t. } i,j \text{ are } m\text{-related}\} \quad (5)$$

Therefore, $p_{i,j}$ in (3) is the probability that cascade m goes viral given both users i and j, and $p_{\neg i,j}$ in (4) is the probability that cascade m goes viral given key user j tweets/retweets it while key user i does not tweet/retweet m or precedes j. The idea is that if $p_{i,j} - p_{\neg i,j} > 0$, then user i is more likely a cause than j for m to become viral. The Kleinberg-Mishra causality ($\in_{K\&M}$) is measured as the average of this quantity to determine how causal a given user i is as follows:

$$\epsilon_{(K\&M)}(i) = \frac{\sum_{j \in R(i)} (p_{i,j} - p_{\neg i,j})}{|R(i)|} \quad (6)$$

Intuitively, $\in_{K\&M}$ measures the degree of causality exhibited by user i. In addition, it was found useful to include a few other measures. The relative likelihood causality ($\in_{rel}$) is introduced as follows:

$$\epsilon_{rel}(i) = \frac{\sum_{j \in R(i)} S(i,j)}{|R(i)|} \quad (7)$$

$$S(i,j) = \begin{cases} \left(\frac{p_{i,j}}{p_{\neg i,j} + \alpha}\right) - 1, & p_{i,j} > p_{\neg i,j} \\ 0, & p_{i,j} = -p_{\neg i,j}, \\ 1 - \left(\frac{p_{\neg i,j}}{p_{i,j}}\right), & \text{otherwise} \end{cases} \quad (8)$$

where α is infinitesimal. Relative likelihood causality metric assesses the relative difference between $p_{i,j}$ and $p_{\neg i,j}$. This assists in finding new users that may not be prioritized by $\in_{K\&M}$. It was also found that if a user is mostly appearing after those with the high value of $\in_{K\&M}$, then it is likely to be a PSM account. One can consider all possible combinations of events to capture this situation. However, this approach is computationally expensive. Therefore, Q(j) is defined as follows:

$$Q(j) = \{i \text{ s.t. } j \in R(i)\} \quad (9)$$

Consider the following example:

Example 1. Consider two cascades (actions) $\tau_1 = \{A, B, C, D, E, F, G, H\}$ and $\tau_2 = \{N, M, C, A, H, V, S, T\}$ where the capital letters signify users. The aim is to relate key users while ϕ=0.5 (Definition 2). Table I shows the related users R(.) for each cascade. Note that the final set R(.) for each user, is the union of all sets from the cascades. Set Q(.) for the users of Table I are presented in Table II.

TABLE I

Related users R(.) (5) of cascades
$T_1 = \{A, B, C, D, E, F, G, H\}$ and $T_2 = \{N, M, C, A, H, V, S, T\}$

| User | $R\tau_1$ | $R\tau_2$ | R |
|---|---|---|---|
| A | {B, C, D, E, F} | {H, V} | {B, C, D, E, F, H, V} |
| B | {C, D, E, F} | { } | {C, D, E, F} |
| C | {D, E, F} | {A, H, V} | {A, D, E, F, H, V} |
| D | {E, F} | { } | {E, F} |
| E | {F} | { } | {F} |
| N | { } | {M, C, A, H, V} | {A, C, H, M, V} |
| M | { } | {C, A, H, V} | {A, C, H, V} |
| H | { } | {V} | {V} |

TABLE II

Set Q(.) of users Table I in (9)

| User | Total |
|---|---|
| A | {C, N, M} |
| B | {A} |
| C | {A, B, N, M} |
| D | {A, B, C} |
| E | {A, B, C, D} |
| N | { } |
| M | {N} |
| H | {A, C, N, M} |

Accordingly, the neighborhood-based causality ($\in_{nb}$) is defined as the average $\in_{K\&M}(i)$ for all $i \in Q(j)$ as follows:

$$\epsilon_{nb}(j) = \frac{\sum_{i \in Q(j)} \epsilon_{K\&M}(i)}{|Q(j)|} \quad (10)$$

The intuition behind this metric is that accounts who are retweeting a message that was tweeted/retweeted by several causal users are potential for PSM accounts. Weighted neighborhood-based causality ($\in_{wnb}$) is defined as follows:

$$\epsilon_{wnb}(j) = \frac{\sum_{i \in Q(j)} w_i \times \epsilon_{K\&M}(i)}{\sum_{i \in Q(j)} w_i} \quad (11)$$

The intuition behind the metric $\in_{wnb}$ is that the users in Q may not have the same impact on user j and thus different weights $w_i$ are assigned to each user i with $\in_{K\&M}$

Problem Statements

The goal is to find the potential PSM accounts from the cascades. Assigning a score to each user and applying threshold-based algorithm is one way of selecting users. As discussed above, causality metrics were defined where each of the metrics or combination of metrics can be a strategy for assigning scores. Users with high values for causality metrics are more likely to be PSM accounts—this relationship is demonstrated between these measurements and the real world by identifying accounts deactivated eventually.

Problem 1. (Threshold-Based Problem). Given a causality metric $\in_k$ where $k \in \{K\&M, rel, nb, wnb\}$, parameter $\theta$, set of users U, we wish to identify set $\{u \text{ s.t. } \forall u \in U, \in_k(u) \geq \theta\}$.

It was found that considering a set of cascades as a hypergraph where users of each cascade are connected to each other can better model the PSM accounts. The intuition is that densely connected users with high values for causality are the most potential PSM accounts. In other words, the interest is in selecting a user if (1.) it has a score higher than a specific threshold or (2.) it has a lower score but occurs in the cascades where high score users occur. Therefore, the label propagation problem is defined as follows:

Problem 2. (Label Propagation Problem). Given a causality metric $\in_k$ where $k \in \{K\&M, rel, nb, wnb\}$, parameters $\theta$, $\lambda$, set of cascades $T=\{\tau_1, \tau_1, \ldots, \tau_n\}$, and set of users U, we wish to identify set S: $S_1, S_2, \ldots, S_I, \ldots, S_{|U|}$ where $S_I=\{u|\forall \tau \in T, \forall u \in (\tau \backslash S_{I-1}), \in_k(u) \geq (H_\tau^I - \lambda)\}$ and $H_\tau^I = \{\min \in_k(u)\}$ s.t. $\forall u \in \tau \wedge u \in U \; S_{I'}\}_{I' \in [1,I)}$ In another problem statement, the framework seeks to determine if causal or decay-based metrics could be leveraged for identifying PSM accounts at early stage of their life span. Note each user can now be represented by a causality vector $x \in \mathbb{R}^d$, which is computed by any of the causality metrics (summarized in Table 3 below) over a period of time. The problem of early identification of PSM accounts is formally defined as follows.

TABLE 3

Summary of the causality metrics.

| Name | Definition | Ref. |
|---|---|---|
| $\varepsilon_{K\&M}^I(i)$ | Given user i, it measures $\varepsilon_{K\&M}^I(i)$ over the time interval I. | (Anonymous 2017) |
| $\varepsilon_{rel}^I(i)$ | Measures the degree of causality exhibited by user i over I while magnifying the difference between $P_{i,j}$ and $P_{-i,j}$ | (Anonymous 2017) |
| $\varepsilon_{nb}^I(j)$ | Measures how likely user j has adopted behavior from users in Q(j) over I. | (Anonymous 2017) |
| $\varepsilon_{wnb}^I(i)$ | Measures how likely user j has adopted behavior from users in Q(j) with different impact on j and over I. | (Anonymous 2017) |
| $\xi_k^I(i)$ | Decay-based variant of $\varepsilon_k^I$ when $k \in \{K\&M, rel, nb, wnb\}$. | This paper |

Problem 3 (Early Identification of PSM Accounts)

Given an action log A, and user u where $\exists$ t s.t. (u, m, t)$\in$A, and $\nexists$ m, t' s.t. (u, m, t')$\in$A $\wedge$ t'>t, our goal is to determine if u's account shall be suspended given its corresponding causality vector x computed till some time point t", where t"<<t.

Algorithms

Algorithm for Threshold-Based Problems

With respect to Problem 1 discussed above, the framework uses a map-reduce programming model to calculate causality metrics. In this approach, users are selected with causality value greater than or equal to a specific threshold. This approach is referred to as the Threshold-Based Selection Approach.

Label Propagation Algorithms

With respect to Problem 2, label propagation algorithms iteratively propagate labels of a seed set to their neighbors. All nodes or a subset of nodes in the graph are usually used as a seed set. A Label Propagation Algorithm (Algorithm 1) is proposed to solve problem 2. First, users with a causality value greater than or equal to a specific threshold (i.e. 0.9) are taken as the seed set. Then, in each iteration, every selected user u can activate user u' if the following two conditions are satisfied: (1.) u and u' have at least one cascade (action) in common and (2.) $\in_k(u')) \geq \in_k(u) - \lambda$, $\lambda \in (0, 1)$. Note that a minimum threshold, such as 0.7, is set so that all users are supposed to satisfy it. In this algorithm, inputs are a set of cascades (actions) T, causality metric $\in_k$ and two parameters $\theta$, $\lambda$ in (0, 1). This algorithm is illustrated by a toy example:

Example 2. Consider three cascades $\{\{A, B, G\}, \{A, B, C, D, E, G, H, I\}, \{E, H, I\}\}$ as shown in hypergraph of FIGS. 1A-1D.

Figure 1B:
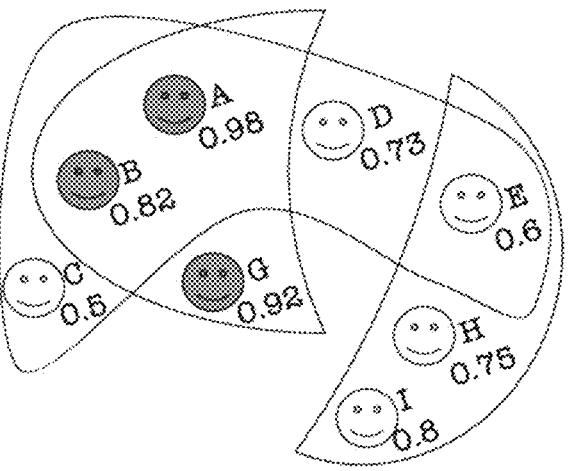
Figure 1C:
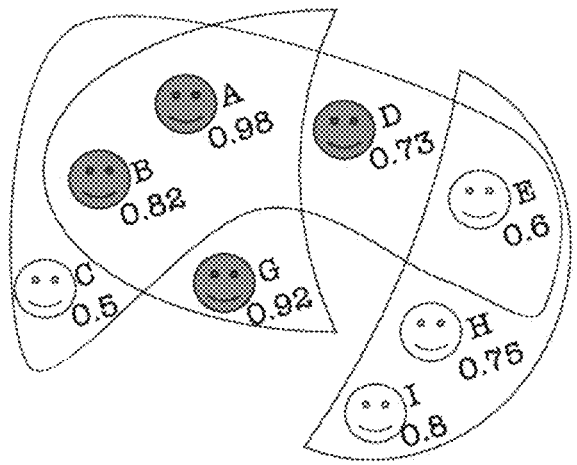
Figure 1D:
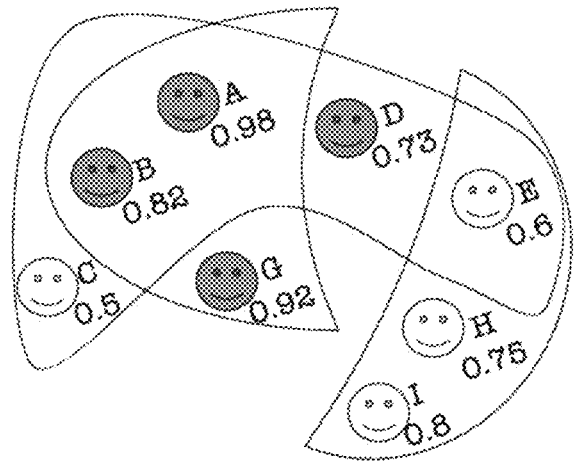

Assuming the minimum acceptable value is set as 0.7; in this case, users C and E would not be activated in this algorithm. Assuming two parameters $\theta=0.9$, $\lambda=0.1$, both users A and G get activated (FIG. 1A). Note that an active user is able to activate inactive ones if (1.) it is connected to the inactive user in the hypergraph, (2.) score of the inactive user meets the threshold. In the next step, only user B will be influenced by G (0.82$\geq$0.92-0.1) as it is shown in FIG. 1B. Then, user D will be influenced by user B (0.73$\geq$0.82-0.1). In the next step (FIG. 1D), the algorithm terminate since no new user is adopted. As it is shown, user I and H are not influenced although they have larger values off in comparison with user D.

Proposition 1. Given a set of cascades T, a threshold $\theta$, parameter $\lambda$, and causality values $\in_k$ where $k \in \{K\&M, rel, nb, wnb\}$, ProSel returns a set of users R=$\{u|\in_k(u) \geq \theta$ or $\exists u' s.t. u', u \in T, \in_k(u) \geq \in_k(u') - \lambda$ and u' is picked$\}$. Set R is equivalent to the set S in Problem 2.

Proposition 2. The time complexity of Algorithm ProSel is $O(|T| \times \text{avg}(\log(|T|)) \times |U|)$ Previous causal metrics do not take into account time-decay effect while computing causality scores. In other words, they assume a steady trend for computing causality of users. This is considered an unrealistic assumption since causal effect of users may change over time. Here, a generic decay-based metric is introduced, which essentially addresses the time-decay effect problem by assigning different time points of a given time interval, different weights, inversely proportional to their distance from t. In more details, this metric does the followings: (1) breaks down the given time interval into shorter time periods, using a sliding time window, (2) deploys an exponential decay function of the form $f(x)=e^{-\alpha x}$ to account for the time-decay effect, and (3) takes average between the causality values computed using the sliding time window. We formally define $\xi_k^I$ as follows, which by varying $k \in \{K\&M, rel, nb, wnb\}$ could be used to compute each of the previous causal metrics.

$$\xi_k^I(i) = \frac{1}{|T|} \sum_{t' \in T} e^{-\sigma(t-t')} \times \mathcal{E}_k^{\Delta}(i) \tag{13}$$

Figure 11:
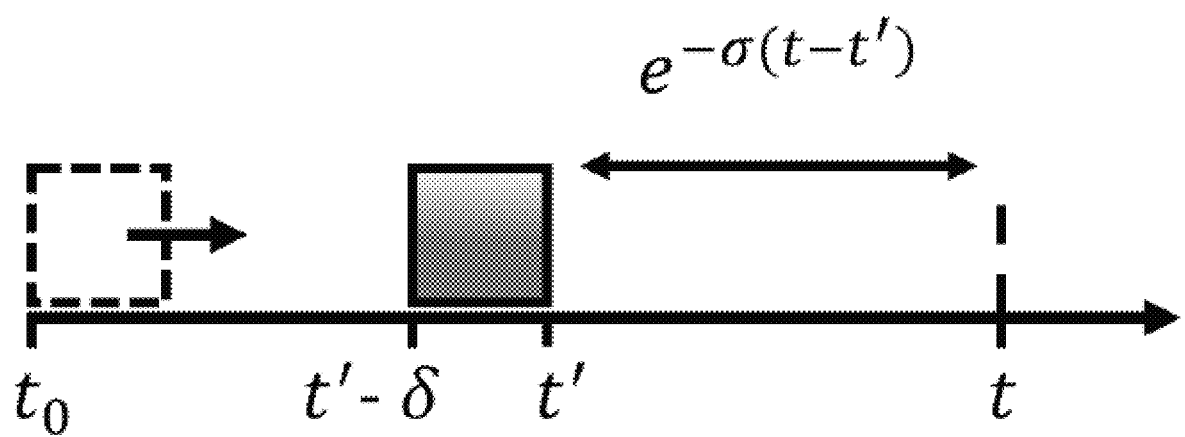
FIG. 11 is an illustration of a proposed metric, according to aspects of the present disclosure.

Here $\sigma$ is a scaling parameter of the exponential decay function, $T=\{t'|t'=t_0+j \times \delta, j \in \mathbb{N} \wedge t' \leq t-\delta\}$, $\delta$ is a small fixed amount of time, which is used as the length of the sliding time window $\Delta=|t'-\delta, t'|$. In FIG. 11, an illustration of the proposed metric is shown.

Figure 12B:
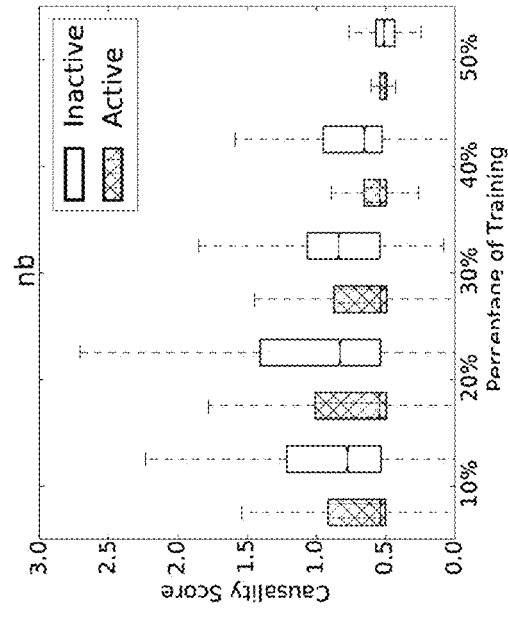
FIGS. 12A-12D are illustrations of box plots of the distributions of the decay-based metrics for active and inactive users, according to aspects of the present disclosure.
Figure 12A:
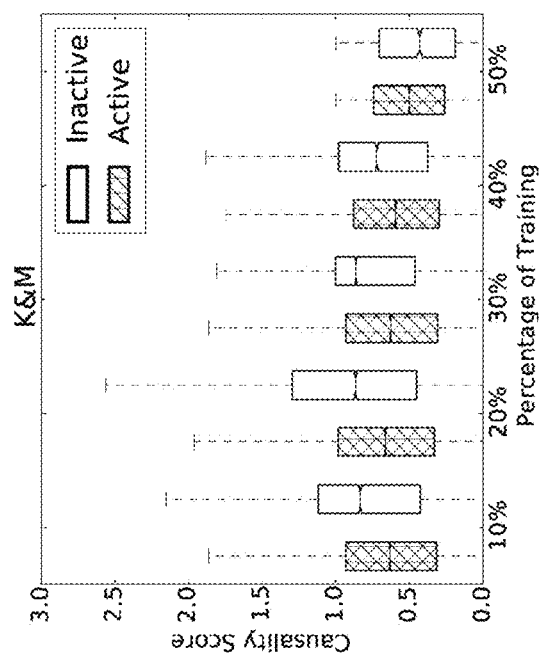
Figure 12D:
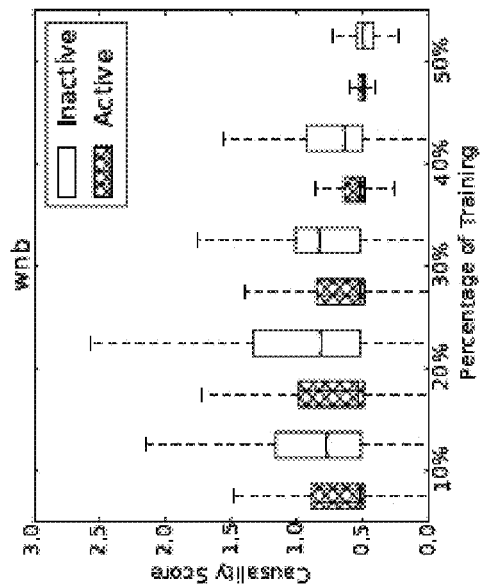
Figure 12C:
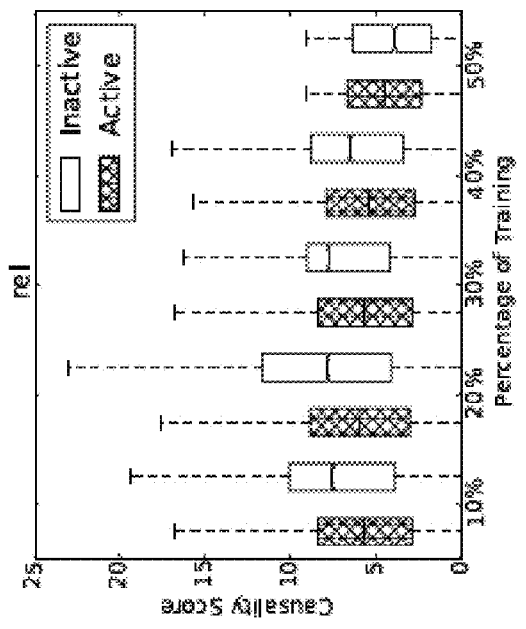
Figure 13A:
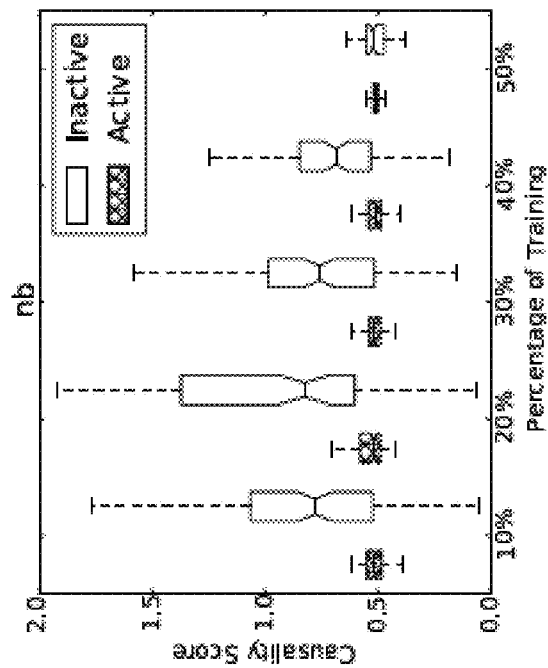
FIGS. 13A-13D are graphical representations showing plots of distributions of users using decay-based metrics according to aspects of the present disclosure.
Figure 13B:
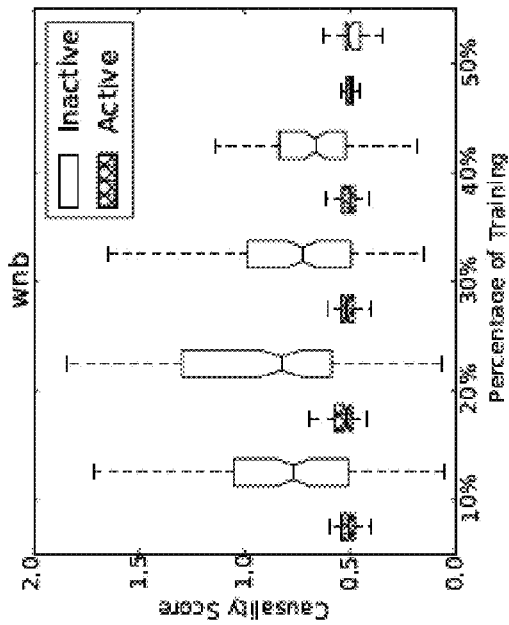
Figure 13C:
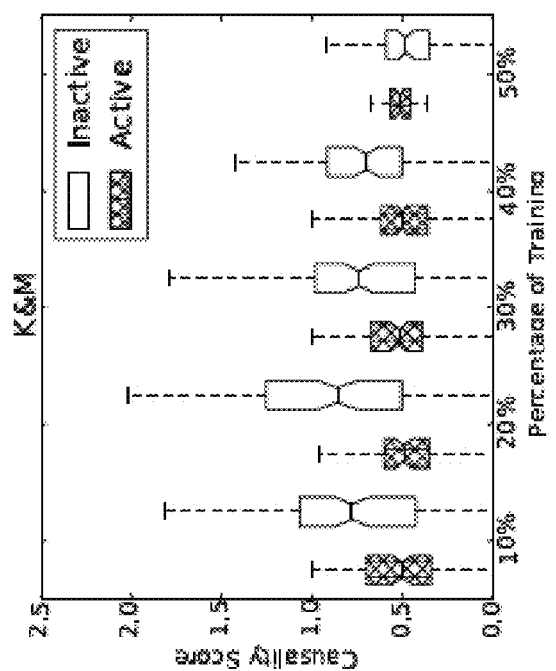
Figure 13D:
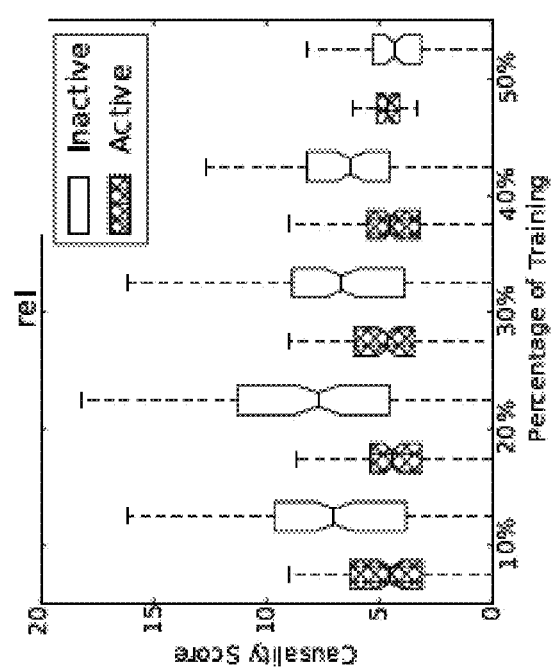

Similar to the previous observations, FIGS. 12A-12O depict box plots of the distributions of the decay-based metrics for active and inactive users. Likewise, we use a threshold of 0.7 for all metrics except for $\xi_{rel}^I$ for which we used a threshold of 7. Table 5 shows F1-scores for the metrics. As before, the metrics together perform the best while the next best one is $\xi_{wnb}^I$. Improvements over the causal metrics discussed before were observed.

TABLE 5

F1-score results for PSM accounts using each decay-based metric. The best performance is in bold.

| Metric | F1-score | | | | |
|---|---|---|---|---|---|
| | 10% | 20% | 30% | 40% | 50% |
| $\xi_{K\&M}^I$ | 0.44 | 0.46 | 0.47 | 0.5 | 0.53 |
| $\xi_{rel}^I$ | 0.36 | 0.38 | 0.39 | 0.41 | 0.42 |
| $\xi_{nb}^I$ | 0.52 | 0.53 | 0.54 | 0.56 | 0.59 |
| $\xi_{wnb}^I$ | 0.54 | 0.55 | 0.57 | 0.58 | 0.6 |
| ALL | 0.57 | 0.59 | 0.6 | 0.62 | 0.63 |

TABLE 6

F1-score results for PSM accounts using each decay-based metric by considering communities. The best performance is in bold.

| Metric | F1-score | | | | |
|---|---|---|---|---|---|
| | 10% | 20% | 30% | 40% | 50% |
| $\xi_{K\&M}^I$ | 0.49 | 0.51 | 0.52 | 0.54 | 0.57 |
| $\xi_{rel}^I$ | 0.4 | 0.43 | 0.46 | 0.49 | 0.5 |
| $\xi_{nb}^I$ | 0.56 | 0.57 | 0.58 | 0.6 | 0.61 |
| $\xi_{wnb}^I$ | 0.57 | 0.58 | 0.6 | 0.62 | 0.63 |
| ALL | 0.59 | 0.61 | 0.62 | 0.65 | 0.67 |

Leveraging Community Structure Aspects of Causality

Having defined the problem of early identification of PSM accounts, the question of whether leveraging community structure of PSM accounts could boost the classification performance by checking if users in a given community establish stronger causal-based relationships with each other compared to the rest of the communities is examined.

To answer this question, since network structure and its underlying graph are not available, a hypergraph $G=(V, E)$ from A is built by connecting any pairs of users who have posted same message chronologically. In this hypergraph, V is a set of vertices (i.e. users) and E is a set of directed edges between users. For sake of simplicity and without loss of generality, we make the edges of this hypergraph, undirected. Next, the LOUVAIN algorithm is utilized to find the partitions $C=\{C_1, C_2, \ldots, C_k\}$ of k communities over G. LOUVAIN is chosen due to its fast runtime and scalability. After detecting the communities, the following two-sample t-test is performed to answer the question:

$$H_0: v_a \geq v_b, H_1: v_a < v_b \quad (14)$$

where the null hypothesis is: users in a given community establish weak causal relations with each other as opposed to the other users in other communities. To work this out, two vectors $v_a$ and $v_b$ are constructed as follows. $v_a$ is generated by computing Euclidean distances between each pair of users $(u_i, u_j)$ who are from same community $C_1 \in C$. Therefore, $v_a$ contains exactly $$\frac{1}{2}\sum_{l=1}^{|C|} |C_l| \cdot (|C_l| - 1)$$

elements in total. Likewise, $v_b$ is constructed of size $$\sum_{l=1}^{|C|} |C_l|$$

by computing Euclidean distance between each user $u_i$ in community $C_1 \in C$, and a random user $u_k$ chosen from the rest of the communities, i.e., $C \setminus C_1$. The null hypothesis is rejected at significance level a=0.01 with the p-value of 4.945e-17. Thus, it is concluded that users in same communities are more likely to establish stronger causal relationships with each other than other users in rest of the communities. The answer to the posed question is thus positive. Note for brevity, t-test results for 10% of the training set were only reported, while making similar arguments for other percentages is straight-forward.

FIGS. 13A-13D shows box plots of the distributions of users using the decay-based metrics and the communities. A clearer distinction was observed between active and suspended accounts, using these new metrics. Again, a threshold of 7 for $\xi_{rel}^I$ was used and 0.7 for the rest. Table 6 shows F1-scores for the metrics. The metrics together reach the best performance while the next best one is $\xi_{wnb}^I$. The results show improvements over previous results.

Algorithm 1 Causal Community Detection-based Classification ($C^2_{DC}$)

Require: Training samples $\{x_1, \ldots, x_N\}$, test samples $\{x'_1, \ldots, x'_N\}$, G, k
Ensure: Predicted labels $\{y1, \ldots, yn,\}$
1: C ← $L_{OUVAIN}(G)$
2: for each $x'_i$ do
3:   $C_l$ ← C' ∈ C s.t $x'_i$ ∈ C'
4:   D ← { }
5:   for each $x_j$ ∈ $C_l$ do
6:     $d_{ij}$ ← $\|x'_i - x_j\|_2$
7:     D ← D ∪ $\{d_{ij}\}$
8:   end for
9:   K ← $K_{NN}(D, k)$
10:  $y'_i$ ← DOMINANT-LABEL(K)
11: end for Next, a causal community detection-based classification algorithm, namely $C^2$DC, is utilized that takes into account causality scores of users and their underlying community structure to perform early detection of PSM accounts. First step of the algorithm involves finding the communities of the hypergraph. The LOUVAIN algorithm is used to find the partitions of the hypergraph. Then, in the second step of our algorithm, each user is classified as either PSM or not based on the available labels of her nearby peers in the same community. Specifically, to determine the label of an unseen user, we first find the community she belongs to. Then, we use the K-NEAREST NEIGHBORS (KNN) algorithm to compute her k nearest neighbors in the same community as hers, based on Euclidean distances between their causality vectors. Finally, the unseen user is labeled based on the majority label of her k nearest neighbors in the community. Note the merit of using community structure over merely using KNN is that, communities can give finer-grained and more accurate sets of neighbors sharing similar causality scores, The proposed framework is shown in Algorithm 1.

Isis Dataset

A dataset was collected from February 2016 to May 2016, consisting of ISIS related tweets/retweets in Arabic. The dataset contains different fields including tweets and the associated information such as user ID, re-tweet ID, hashtags, content, date and time. The dataset also contains user profile information, including name, number of followers/followees, description, location, etc. About 53M tweets are collected based on the 290 hashtags such as Terrorism, State of the Islamic-Caliphate, Rebels, Burqa State, and Bashar-Assad, Ahrar Al-Sham, and Syrian Army. In this dataset, about 600K tweets have at least one URL (i.e., event) referencing one of the social media platforms or news outlets. There are about 1.4M of paired URLs which are denoted by $\mu_1 \rightarrow \mu_2$ and indicates a retweet (with the URL $\mu_2$) of the original tweet (with the URL $\mu_1$). In this paper, we only use tweets (more than 9M) associated with viral cascades. The statistics of the dataset are presented in Table III discussed in details below.

TABLE III

Statistics of the dataset

| Name | Values |
|---|---|
| Tweets | 9,092,978 |
| Cascades | 35,251 |
| Users | 1,249,293 |
| Generator users | 8,056 |

Figure 2A:
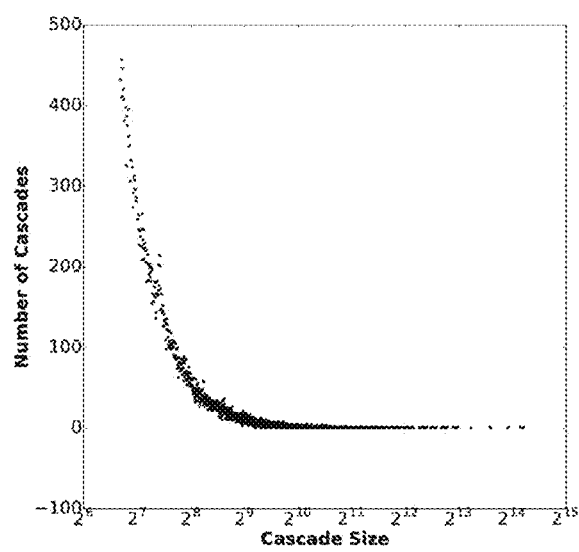
FIGS. 2A-2B are graphical representations of the number of cascades vs. cascade size, according to aspects of the present disclosure.
Figure 2B:
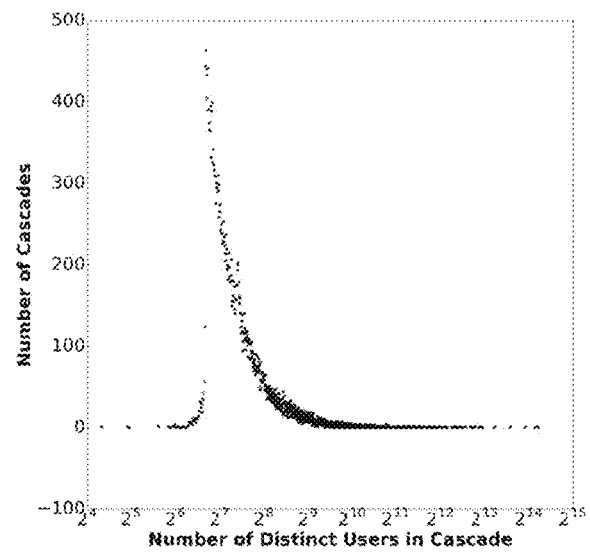
Figures 3A, 3B, 3C:
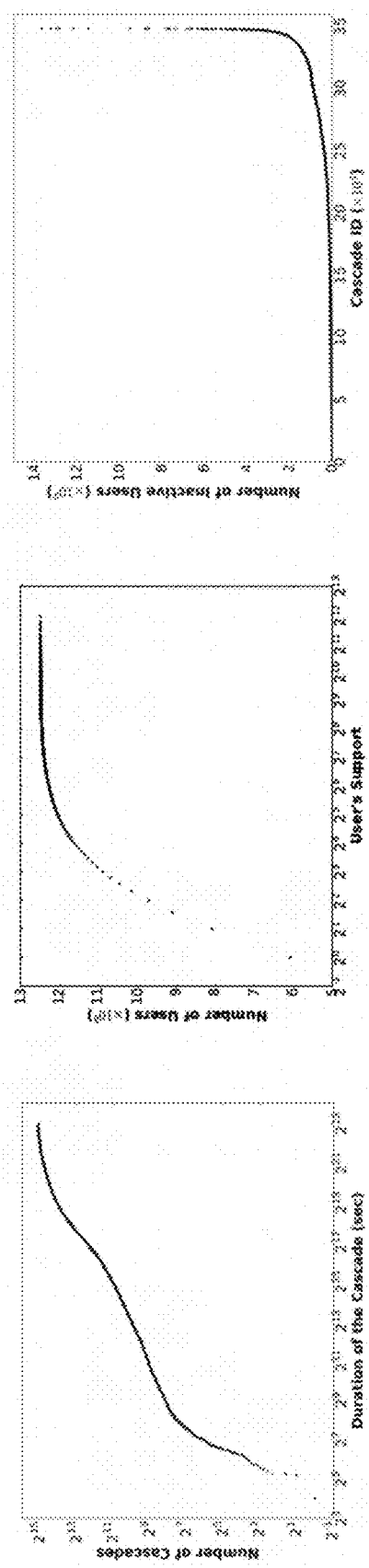
FIGS. 3A-3C are graphical representations showing the cumulative distribution of the number of times a user has participated in cascades, according to aspects of the present disclosure.

Cascades. The present disclosure aims to identify PSM accounts—which in this dataset are mainly social bots or terrorism-supporting accounts that participate in viral cascades. The tweets that have been retweeted from 102 to 18,892 times. This leads to more than 35k cascades which are tweeted or retweeted by more than 1M users. The distribution of the number of cascades vs cascade size is illustrated in FIG. 2A. There are users that retweet their own tweet or retweet a post several times; however, only the first tweet/retweet of each user for a given cascade is considered. In other words, duplicate users are removed from the cascades, which make the size of the viral cascades from 20 to 18,789 as shown in FIG. 2B. The distribution of the cascades over the cascade life span is illustrated in FIG. 3A. Cascades took from 16 seconds to more than 94 days to complete.

Users. There are more than 1M users that have participated in the viral cascades. FIG. 3B demonstrates the cumulative distribution of the number of times a user have participated in the cascades. As it is shown, the larger the support value is, the less number of users exists. Moreover, users have tweeted or retweeted posts from 1 to 3,904 times and on average each user has participated more than 7 times.

TABLE IV

Status of a subset of the users in the dataset.

| Name | Active | Inactive | Total |
|---|---|---|---|
| Users | 723,727 | 93,770 | 817,497 |
| Generator users | 7,243 | 813 | 8,056 |

User's Current Status. Key users are selected that have tweeted or retweeted a post in its early life span—among first half of the users (according to Definition 2, $\phi$=0.5), and check whether they are active or not. Accounts are not active if they are suspended or deleted. More than 88% of the users are active as shown in Table IV. The statistics of the generator users are also reported. Generator users are those that have initiated a viral cascade. As shown, 90% of the generator users are active as well. Moreover, there are a significant number of cascades with hundreds of inactive users. The number of inactive users in every cascade is illustrated in FIG. 3C. Inactive users are representative of automatic and terrorism accounts aiming to disseminate their propaganda and manipulate the statistics of the hashtags of their interest.

Generator Users. In this part, users that have generated the viral tweets are only considered. According to Table IV, there are more than 7k active and 800 inactive generator users. That is, more than 10% of the generator users are suspended or deleted, which means they are potentially automated accounts. The distribution of the number of tweets generated by generator users shows that most of the users (no matter active and inactive) have generated a few posts (less than or equal to 3) while only a limited number of users are with a large number of tweets.

Figure 5:
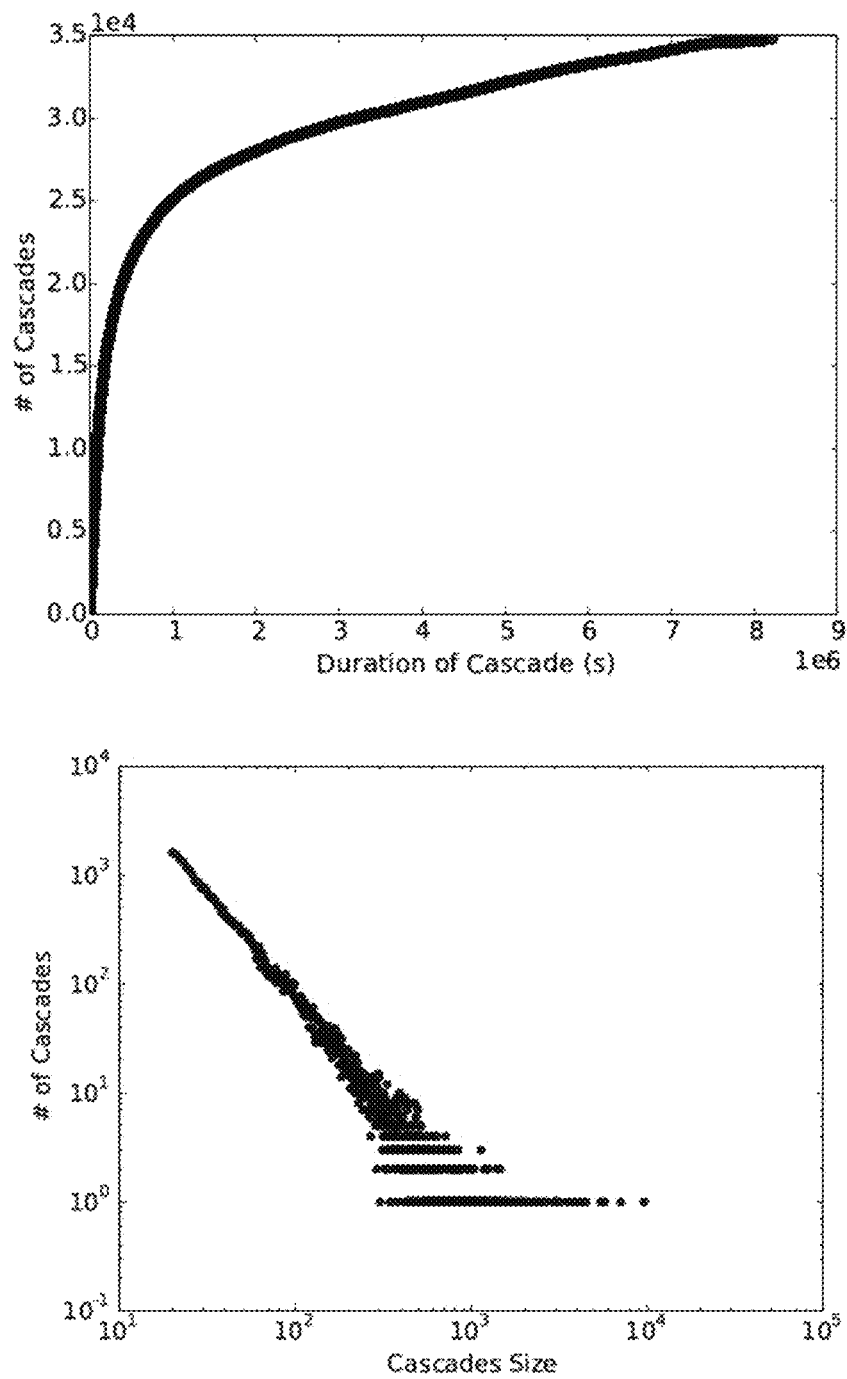
FIG. 5 shows a log-log distribution of cascades vs. cascade size (top) and cumulative distribution of duration of cascades (bottom)

Impact of $\mu_1$ on $\mu_2$. In this part, the impact of the URL $\mu_1$ on $\mu_2$ is investigated. Accordingly, the dataset contains 35K cascades (i.e., sequences of events) of different sizes and durations, some of which contain paired URLs in the aforementioned form. After pre-processing and removing duplicate users from cascades (those who retweet themselves multiple times), cascades sizes (i.e. number of associated postings) vary between 20 to 9,571 and take from 10 seconds to 95 days to finish. The log-log distribution of cascades vs. cascade size and the cumulative distribution of cascades are depicted in FIG. 5.

Figure 6:
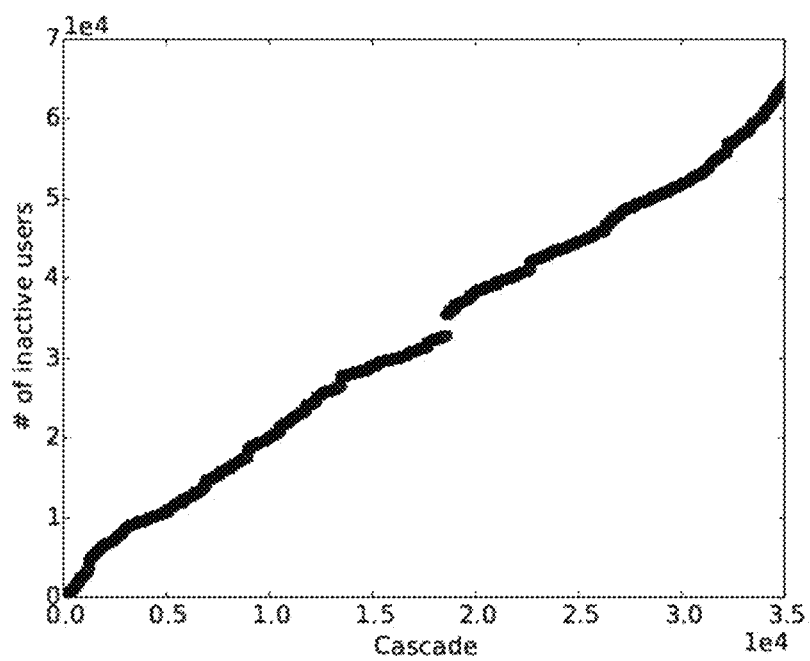
FIG. 6 shows the total number of inactive users in each cascade.

The statistics of the dataset are presented in Table V. For labeling, the Twitter API is checked to examine whether the users have been suspended (labeled as PSM) or they are still active (labeled as normal). According to Table V, 11% of the users in the dataset are PSMs and others are normal. The total number of PSM accounts that have been suspended by Twitter is depicted in each cascade in FIG. 6. Finally, it should be noted that these accounts mostly get suspended manually by Twitter based on reports the platform receives from its own users.

TABLE V

Description of the dataset

| Name | Value | |
|---|---|---|
| # of Cascades | 35 K | |
| # of Tweets/Retweets | 2.8 M | |
| | PSM | Normal |
| # of Users | 64,484 | 536,609 |
| # of Single URLs | 104,948 | 536,046 |
| # of Paired URLs | 200,892 | 1,123,434 |

Social Media Platforms and News Outlets

Twitter deploys a URL shortener technique to leave more space for content and protect users from malicious sites. To obtain the original URLs, a URL unshortening tool is used. This tool obtains the original links contained in the tweets of the dataset.

A number of major and well known social media platforms are considered, including Facebook, Instagram, Google, and YouTube. About the dichotomy of mainstream and alternative media, it is notable to mention that most criteria for determining whether a news source counts as either of them are based on a number of factors including but not limited to the content and whether or not it is corporate owned. However, a key difference between these two sources of media comes from the fact that all of mainstream media is profit oriented, in contrast to alternative media. It is further noted that, for the most part, mainstream media is considered a more credible source than alternative media, although the reputation has been recently tainted by the fake news.

Popular news outlets such as The New York Times and The Wall Street Journal are considered as mainstream and less popular ones as alternatives. In Table VI, the total number of paired URLs (i.e. $\mu_1 \rightarrow \mu_2$) in which the original URL (i.e. $\mu_1$) corresponds to each social media platform with at least one event in the dataset is summarized. In Table VII, the total number of paired URLs whose original URL belongs to the mainstream and alternative news sources is summarized. Table VIII shows the breakdown of the number of paired URLs for the PSM and normal users. Table IX further demonstrates some examples of the mainstream and alternative news URLs occurrence used in the work.

TABLE VII

News sources' total paired URLs ($\mu_1 \rightarrow \mu_2$) with at least one event in the dataset for the PSM and normal users.

| Platform | PSM | Normal |
|---|---|---|
| Twitter | 139,940 | 918,803 |
| Facebook | 878 | 4,017 |
| Instagram | 0 | 2,857 |
| Google | 163 | 132 |
| Youtube | 24,724 | 72,890 |

TABLE VIII

Total number of paired URLs of the form $\mu_1 \rightarrow \mu_2$ with at least one event in the dataset for the PSM/normal users and for all platforms.

| News Source | PSM | Normal |
|---|---|---|
| Mainstream | 0 | 286 |
| Alternatives | 35,187 | 124,449 |

TABLE IX

Examples of mainstream and alternative news used in this work. Popular news outlets are assigned to mainstream and the rest to alternatives.

|  | → Twitter | → Facebook | → Instagram | → Google | → Youtube | → Mainstream | → Alternatives |
|---|---|---|---|---|---|---|---|
| Twitter → | 109,354/766,617 | 598/3,843 | 229/2,461 | 120/382 | 11,992/59,889 | 90/688 | 17,557/84,923 |
| Facebook → | 655/3,108 | 4/41 | 3/9 | 2/1 | 87/281 | 0/1 | 127/576 |
| Instagram → | 0/2,362 | 0/11 | 0/25 | 0/2 | 0/161 | 0/2 | 0/294 |
| Google → | 134/74 | 0/0 | 0/1 | 0/0 | 12/53 | 0/0 | 17/4 |
| Youtube → | 14,004/56,545 | 132/312 | 23/211 | 22/32 | 6,799/7,529 | 13/48 | 3,731/8,213 |
| Mainstream → | 0/189 | 0/1 | 0/1 | 0/0 | 0/13 | 0/1 | 0/81 |
| Alternatives → | 21,047/95,641 | 145/767 | 45/318 | 59/64 | 3,862/9,199 | 26/122 | 10,003/18,338 |

TABLE VI

Social media platform's total number of paired URLs of the form ($\mu_1 \rightarrow \mu_2$) with at least one event in the dataset for the PSM and normal users

| Mainstream | Alternatives |
|---|---|
| hups://www.nytimes.com | https://www.rt.com |
| https://www.reuters.com | https://www.arabi21.com |
| https://www.wsj.com | https://www.7adramout.net |
| https://www.nbcnews.com | https://www.addiyar.com |
| https://www.ft.com | https://zamnpress.com |

Temporal Analysis

Here, the differences between PSM accounts with their counterparts, normal users, through temporal analysis of their posted URL's are presented.

Figure 7:
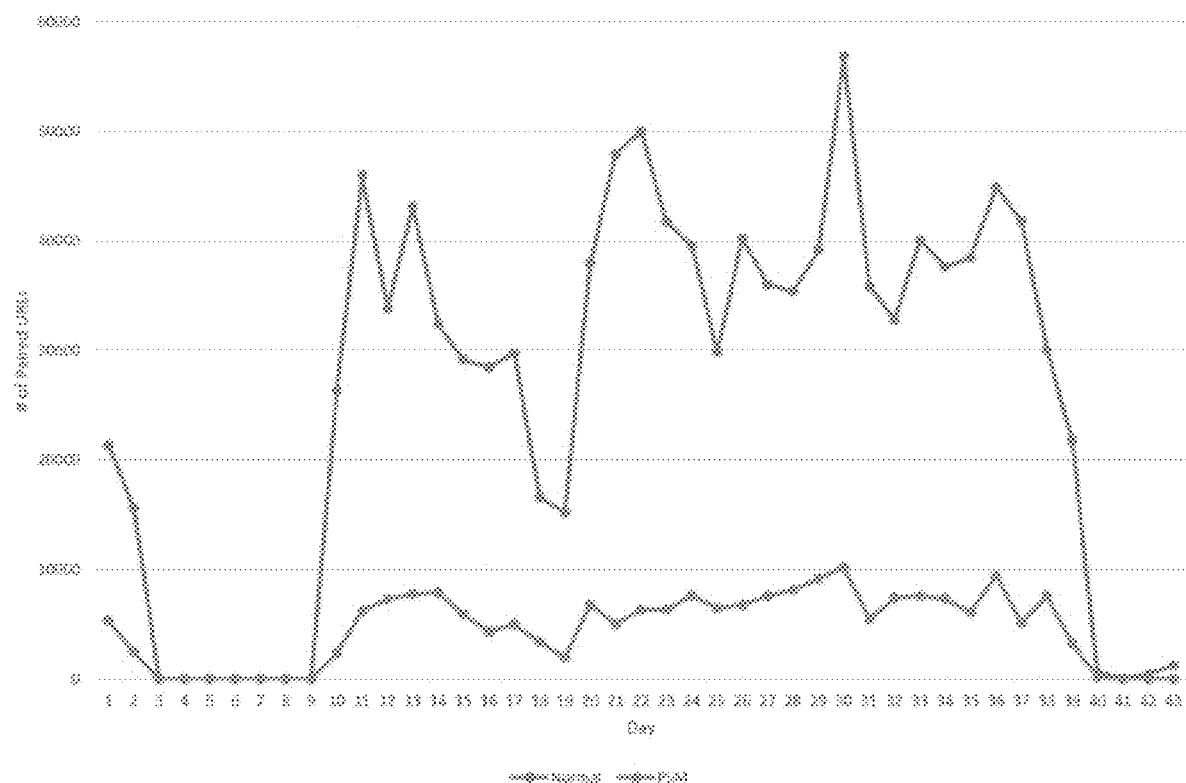
FIG. 7 shows the number of paired URLs posted by the PSM and normal users in the dataset. Note that the normal users in the dataset are higher than the PSM accounts.

In FIG. 7, the daily occurrence of the paired URL's over the span of 43 days for both PSM and normal users is depicted. The dataset has a larger number of normal users and higher number of the posted URL's compared to PSM accounts. Therefore, it is reasonable to observe more activity from normal users than PSMs. For both groups of users, a similar trend in spikes and their duration is observed. As it is seen, distinguishing between PSMs and normal users merely based on the occurrence of URLs and their patterns is not reliable. Therefore, experiments are conducted using a more sophisticated statistical technique known as "Hawkes Process".

Framework

In the previous section, a data analysis to demonstrate differences between PSM accounts and normal users in terms of URLs they usually post on Twitter was presented. The next step is to assess their impact via a well known mathematical process called "Hawkes Process". A Hawkes process is used since the platforms introduced are dependent and thus not disjoint, meaning that they are affected by each other, while they have their own background events.

A. Hawkes Process

In many scenarios, one has to deal with timestamped events such as the activity of users on a social network recorded in continuous time. An important task then is to estimate the influence of the nodes based on their timestamp patterns. Point process is a principled framework for modeling such event data, where the dynamic of the point process can be captured by its conditional intensity function as follows:

$$\lambda(t) = \lim_{\Delta t \to 0} \frac{\mathbb{E}(N(t+\Delta t) - N(t) | \mathcal{H}_t)}{\Delta t} = \frac{\mathbb{E}(dN(t) | \mathcal{H}_t)}{dt}.$$

Where $\mathbb{E}(dN(t) | \mathcal{H}_t)$ is the expectation of the number of events which happened in the interval (t, t+dt] given the historical observations $\mathcal{H}_t$, and N(t) records the number of events before time t. Point process can be equivalently represented as a counting process $N=\{N(t)|t\in[0,T]\}$ over the time interval $[0, T]$.

The Hawkes process framework has been used in many problems that require modeling complicated event sequences where historical events have impact on future ones. Examples include but are not limited to financial analysis, seismic analysis, and social network modeling. One-dimensional Hawkes process is a point process $N_t$ with the following particular form of intensity function:

$$\lambda(t) = \mu + a\int_{-\infty}^{t} g(t-s)dN_s = \mu + a\sum_{i:t_i<t} g(t-t_i)$$

where $\mu>0$ is the exogenous base intensity (i.e. the background rate of events), $t_i$ are the time of events in the point process before time t, and $g(t)$ is the decay kernel.

Here, the exponential kernal of the form $g(t)=we^{-wt}$ is used, but adapting to the other positive terms is straightforward. The second part of the above formulation captures the self exciting nature of the point processes—the occurrence of events in the past has a positive impact on future ones. Given a sequence of events $\{t_i\}_{i=1}^{n}$ observed in $[0, T]$ and generated from the above intensity function, the log-likelihood function can be obtained as follows:

$$\mathcal{L} = \log\frac{\prod_{i=1}^{n} \lambda(t_i)}{\exp\int_0^T \lambda(t)dt} = \sum_{i=1}^{n} \log\lambda(t_i) - \int_0^T \lambda(t)dt$$

Here, the focus is on multi-dimensional Hawkes processes which is defined by U-dimensional point process $N_t^u$, $u=1, \ldots, U$. In other words, U Hawkes processes are coupled with each other—each Hawkes process corresponds to one of the platforms and the influence between them is modeled using the mutually exciting property of the multi-dimensional Hawkes processes. The following formulation to model the influence of different events on each other is formally defined:

$$\lambda_u(t) = \mu_u + \sum_{i:t_i<t} a_{uu_i} g(t-t_i)$$

where $\mu_u \geq 0$ is the base intensity for the u-th Hawkes process. The coefficient $a_{uu_i} \geq 0$ captures the mutually-exciting property between the u-th and $u_i$-th dimension are more likely to trigger an event in u-th dimension in the future. More intuitively, an event on one point process can cause an impulse response on other processes, which increases the probability of an event occurring above the processes' background rates. To reiterate, each URL is attributed to an event, i.e. if the URL $u_1$ triggers the URL $u_2$ (i.e. $u_1 \rightarrow u_2$), then $a_{u_2u_1} \geq 0$.

Figure 8:
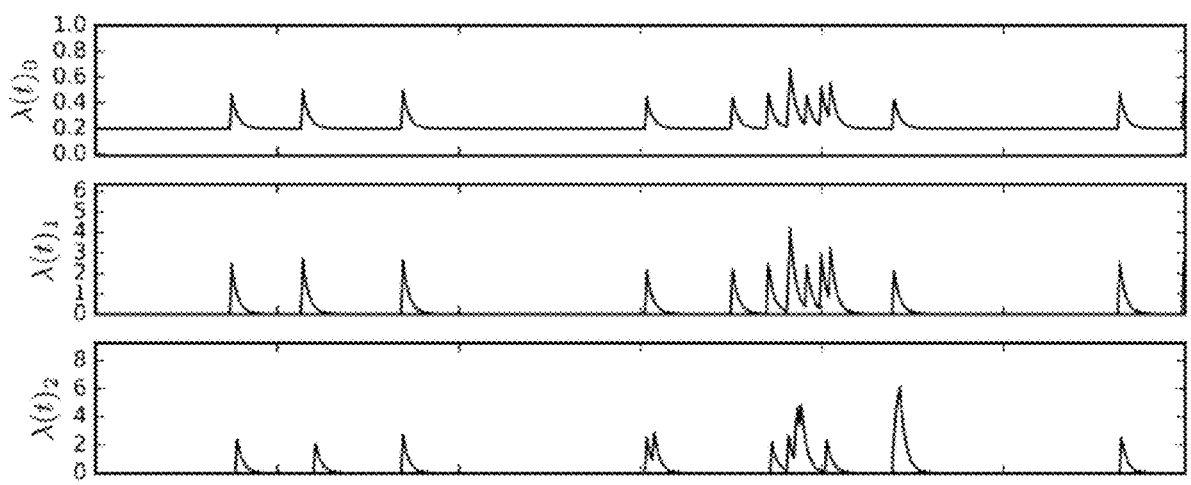
FIG. 8 illustrates the Hawkes Process. Events induce impulse on other processes and cause child events. Background event in $e_0$ induces impulse on responses on processes $e_1$ and $e_2$.

In FIG. 8, a multivariate example of three different streams of events, $e_0$, $e_1$, and $e_2$. As illustrated, $e_0$ is caused by the background rate $\lambda(t)_0$ and has an influence on itself and $e_1$. On the other hand, $e_1$ is caused by $\lambda(t)_1$ and has an influence on $e_2$. Simply put, a background event in $e_0$ induces impulse on responses on processes $e_1$ and $e_2$. Accordingly, the caused child event in $e_1$ leads to another child event in $e_2$.

Consider an infectivity matrix $A=[a_{uu_i}] \in \mathbb{R}^{D\times D}$, which collects the self triggering coefficients between Hawkes processes, and $D=7$ is the number of processes (i.e. platforms). Each entry in this matrix indicates the strength of influence each platform has on other platforms.

B. Methodology

The goal is to assess the influence of the PSM accounts in the dataset via their posted URLs. The URLs posted by two groups of users are considered: (1) PSM accounts and (2) normal users. For both groups, a Hawkes model with $K=7$ point processes each is fitted for each category of social media and news outlets.

In each of the Hawkes models, every process is able to influence all the others including itself, which allow for the estimation of the strength of connections between each of the seven categories for both groups of users, in terms of how likely an event (i.e. the posted URL) can cause subsequent events in each of the groups.

The $A_{DM}A$ algorithm is used and the methodology presented for fitting the Hawkes processes for both PSM and normal users is used. $A_{DM}A$ is an efficient optimization that estimates the parameters A and $\mu$ by maximizing the regularized log-likelihood $\mathcal{L}(A,\mu)$:

$$\min_{A\geq 0, \mu\geq 0} -\mathcal{L}(A,\mu) + \lambda_1\|A\|_* + \lambda_2\|A\|_1$$

where $\mathcal{L}(A,\mu)$ can be obtained by substituting _____ from Equation _____ into Equation _____. Also, $\|(A,\mu)\|_*$ is the nuclear form of matrix A, and is defined as the sum of its singular value.

Two different sets of URLs posted by the PSM account and normal users are considered by selected URLs that have at least one event in Twitter (i.e. posted by a user). For each group, a matrix $W \in \mathbb{N}^{T\times D}$ with $D=7$, whose entries are sequences of events (i.e. posted URLs) observed during time period T are constructed. Each sequence of events is of the form $S=\{(t_i, u_i)\}_{i=1}^{n_i}$ where $n_i$ is the number of events occurring at the ui-th dimension (i.e., URLs posted containing one of the 7 platforms).

C. Settings

The $A_{DM}A$ algorithm is adopted, which implements parametric interference for Hawkes processes with an exponential kernel and a mix of Lasso and nuclear regularization. The infectivity matrix A, base intensities $\mu$, and decays $\beta \in \mathbb{R}$ Rare initialized randomly.

The number of nodes is set to $D=7$ to reflect the 7 platforms used in this analysis. Level of penalization is set to $C=1000$, and the ratio of Lasso-Nuclear regularization mixing parameter is set to 0.5. Finally, he maximum number of iterations for solving the optimization is set to 50 and the tolerance of solving algorithm is set to 1 e-5.

Causality Analysis

The behavior of the causality metrics is examined. Users are analyzed based their current account status in Twitter. A user is labeled as active (inactive) if the account is still active (suspended or deleted).

Figure 4A:
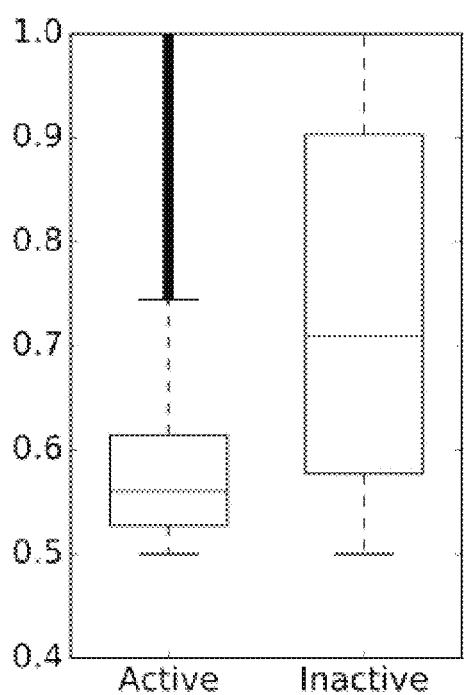
FIGS. 4A-4D are graphical representations showing the distribution between active and inactive users, according to aspects of the present disclosure.
Figure 4B:
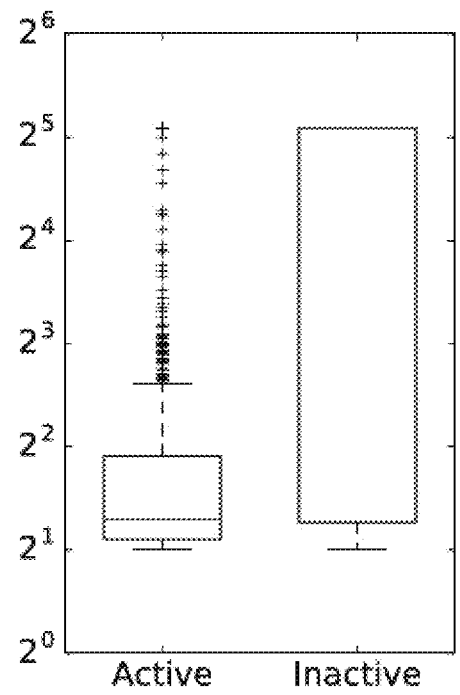

Kleinberg-Mishra Causality. Users were studied that had a causality value of $\in_{K\&M}$ greater than or equal to 0.5. As expected, inactive users exhibit different distribution from active users (FIG. 4A). It was noted that significant differences are present—more than 75% of the active users are distributed between 0.5 and 0.62, while more than 50% of the inactive users are distributed from 0.75 to 1. Also, inactive users have larger values of mean and median than active ones. Note that number of active and inactive users is 404,536 and 52,452. This confirms that this metric is a good indicator to discriminate PSM users from the normal users. Additionally, several related causality measures and a label-propagation algorithm for finding "slave PSM accounts" have been developed. Relative Likelihood Causality. This metric magnifies the interval between every pairs of the probabilities that measures the causality of the users; therefore, the values vary in a wide range. FIG. 4B displays the distribution of users having relative likelihood causality of greater than or equal to two. In this metric, 1,274 users get very large values. For the sake of readability, very large values are replaced with 34.0 in FIG. 4B. More than 50% of the inactive users get values greater than 32, while the median of active users is 2.48. More than 75% of the active users are distributed in the range of (2, 4). Note that number of active and inactive users in this figure is 3,563 and 1,041, respectively. That is, using this metric and filtering users with the relative likelihood greater than a threshold, leads to the good precision. For example, the threshold in FIG. 4B is set to 2—the precision is more than 0.22 for inactive class. Considering users with a very large value can lead to a precision of more than 0.5 and uncovering a significant number of PSMs—638 inactive users.

Figure 4C:
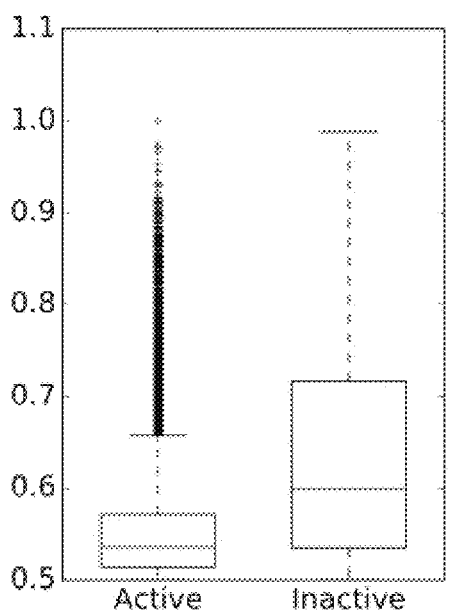

Neighborhood-Based Causality. The users having a causality value of $\in_{nb}$ greater than or equal to 0.5 were studied. As expected, inactive users exhibit different distribution from active users as shown in FIG. 4C. Also, inactive users are mostly distributed in the higher range and have larger values of mean and median than active ones. More than 75% of the active users are distributed between 0.5 and 0.6, while more than 50% of the inactive users are distributed from 0.6 to 1. Therefore, increasing the threshold results in the higher precision for the PSM users. Note that the number of active and inactive users is 85,864 and 10,165.

Figure 4D:
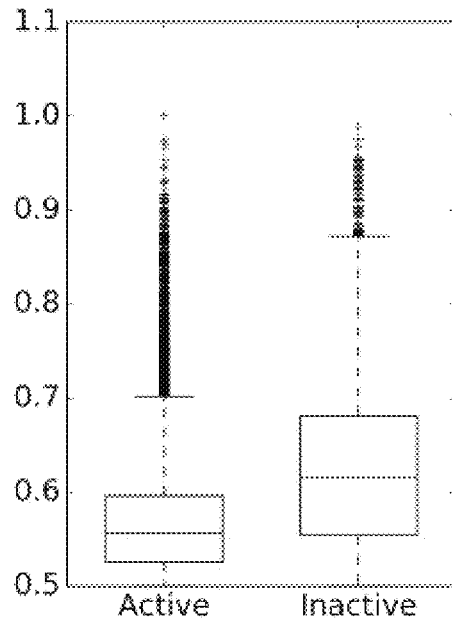

Weighted Neighborhood-Based Causality. This metric is the weighted version of the previous metric ($\in_{nb}$). A weight is assigned to each user in proportion to her participation rate in the viral cascades. FIG. 4D shows the distribution of users with $\in_{wnb}$ greater than or equal to 0.5. This metric also displays different distribution for active and inactive users. More than 75% of the active users are distributed between 0.5 and 0.6, while more than 50% of the inactive users are distributed from 0.6 to 1. Note that the number of active and inactive users of $\in_{wnb}$ 52,346 and 16,412. In other words, this metric achieves the largest precision compared to other metrics, 0.24. Clearly, increasing the threshold results in the higher precision for the PSMs.

Results and Discussion

The Scala Spark and Python 2.7x were run on an Intel Xeon CPU (1.6 GHz) with 128 GB of RAM running Windows 7. The parameter φ was set to label key users 0.5 (Definition 2). Thus, for the users that participate in the action before the number of participants gets twice.

In the following sections, two proposed approaches are considered: (1) Threshold-Based Selection Approach—selecting users based on a specific threshold, (2) Label Propagation Selection Approach—selecting by applying Algorithm 1. The intuition behind this approach is to select a user if it has a score higher than a threshold or has a lower score but occurs in the cascades that high score users exist. The methods are evaluated based on true positive (True Pos), false positive (False Pos), precision, the average (Avg CS) and median (Med CS) of cascade size of the detected PSM accounts. Note that in our problem, precision is the most important metric. The main reason is labeling an account as PSM means it should be deleted. However, removing a real user is costly. Therefore, it is important to have a high precision to prevent removing real user.

Existing Method

In the proposed method, all features that could be extracted from the dataset include tweet syntax (average number of hashtags, average number of user mentions, average number of links, average number of special characters), tweet semantics (LDA topics), and user behavior (tweet spread, tweet frequency, tweet repeats). Three existing methods were to detect PSM accounts: 1) Random selection: This method achieves the precision of 0.11. This also presents that the data is imbalanced and less than 12% of the users are PSM accounts. 2) Sentimetrix (Sentimet.): The data was clustered by DBSCAN algorithm. The labels were then propagated from 40 initial users to the users in each cluster based on the similarity metric. Support Vector Machines (SVM) were used to classify the remaining PSM accounts [10]. 3) Classification methods: In this experiment, the same labeled accounts were used as the previous experiment and different machine learning algorithms were applied to predict the label of other samples. Features based on the limitations of access to data into three categories were then grouped together. First, only content information (Content) is used to detect the PSM accounts. Second, content independent features (NoCont.) is used to classify users. Third, all features (All feat.) are applied to discriminate PSM accounts. The best result for each setting is when we apply Random Forest using all features. According to the results, this method achieves the highest precision of 0.16. Note that, most of the features used in the previous work and our baseline take advantage of both content and network structure. However, there are situations that the network information and content do not exist. In this situation, the best baseline has the precision of 0.15. The average (Avg CS) and median (Med CS) of the size of the cascades were studied in which the selected PSM accounts have participated. Table X also illustrates the false positive, true positive and precision of different methods.

TABLE X

Existing Methods—number of selected users as PSM

| Method | False Pos | True Pos | Precision | Avg CS | Med CS |
|---|---|---|---|---|---|
| Random | 80,700 | 10,346 | 0.11 | 289.99 | 184 |
| Sentimet. | 640,552 | 77,984 | 0.11 | 261.37 | 171 |
| Content | 292,039 | 43,483 | 0.13 | 267.66 | 174 |
| NoCont. | 357,027 | 63,025 | 0.15 | 262.97 | 172 |
| Al/feat. | 164,012 | 31,131 | 0.16 | 273.21 | 176 |

Threshold-Based Selection Approach

In this experiment, all the users were selected that satisfied the thresholds and checked whether they were active or not. A user is inactive if the account is suspended or closed. Since the dataset is not labeled, inactive users were labeled as PSM accounts. The threshold for all metrics was set to 0.7 except for relative likelihood causality ($E_{rel}$), (which is set to 7. Two types of experiments were conducted: first, user selection for a given causality metric was studied. This approach was further studied using the combinations of metrics.

Single Metric Selection. In this experiment, users were selected based on each individual metric. As expected, these metrics can assist in filtering a significant amount of active users and overcome the data imbalance issue. Metric $\in_{K\&M}$ achieves the largest recall in comparison with other metrics. However, it has a maximum number of false positives. Table XI shows the performance of each metric. The precision value varies from 0.43 to 0.66 and metric $\in_{wnb}$ achieves the best value. Metric $\in_{rel}$ finds the more important PSM accounts with average cascade size of 567.78 and median of 211. In general, the detected PSM accounts have participated in the larger cascades in comparison with baseline methods. It was also observed that these metrics cover different regions of the search area. In other words, they select different user sets with little overlap between each other. The common users between any two pairs of the features are illustrated in Table XII. Considering the union of all metrics, 36,983 and 30,353 active and inactive users are selected, respectively.

TABLE XI

Threshold-based selection approach—
number of selected users using single metric

| Method | False Pos | True Pos | Precision | Avg CS | Med CS |
|---|---|---|---|---|---|
| Allfeat. | 164,012 | 31,131 | 0.16 | 273.21 | 176 |
| NoCont. | 357,027 | 63,025 | 0.15 | 262.97 | 172 |
| $\in_{K\&M}$ | 36,159 | 27,192 | 0.43 | 383.99 | 178 |
| $\in_{rel}$ | 693 | 641 | 0.48 | 567.78 | 211 |
| $\in_{nb}$ | 2,268 | 2,927 | 0.56 | 369.46 | 183.5 |
| $\in_{wnb}$ | 7,463 | 14,409 | 0.66 | 311.84 | 164 |

TABLE XII

Threshold-based selection approach - number
of common selected users using single metric

| Status | Active | | | Inactive | | |
|---|---|---|---|---|---|---|
| Method | $\in_{rel}$ | $\in_{nb}$ | $\in_{wnb}$ | $\in_{rel}$ | $\in_{nb}$ | $\in_{wnb}$ |
| $\in_{K\&M}$ | 404 | 1,903 | 6,992 | 338 | 2,340 | 11,748 |
| $\in_{rel}$ | | 231 | 175 | | 248 | 229 |
| $\in_{wnb}$ | | | 1,358 | | | 1,911 |

Combination of Metrics Selection. According to Table XII, most of the metric pairs have more inactive users in common than active users. The experiment attempted to select users that satisfy the threshold for at least three metrics. It was determined that 1,636 inactive users were obtained out of 2,887 selected ones, which works better than $\in_{K\&M}$ and $\in_{rel}$ while worse than $\in_{nb}$ and $\in_{wnb}$. In brief, this approach achieves precision of 0.57. Moreover, the number of false positives (1,251) was lower than most of the other metrics.

Label Propagation Selection Approach

Figure 9:
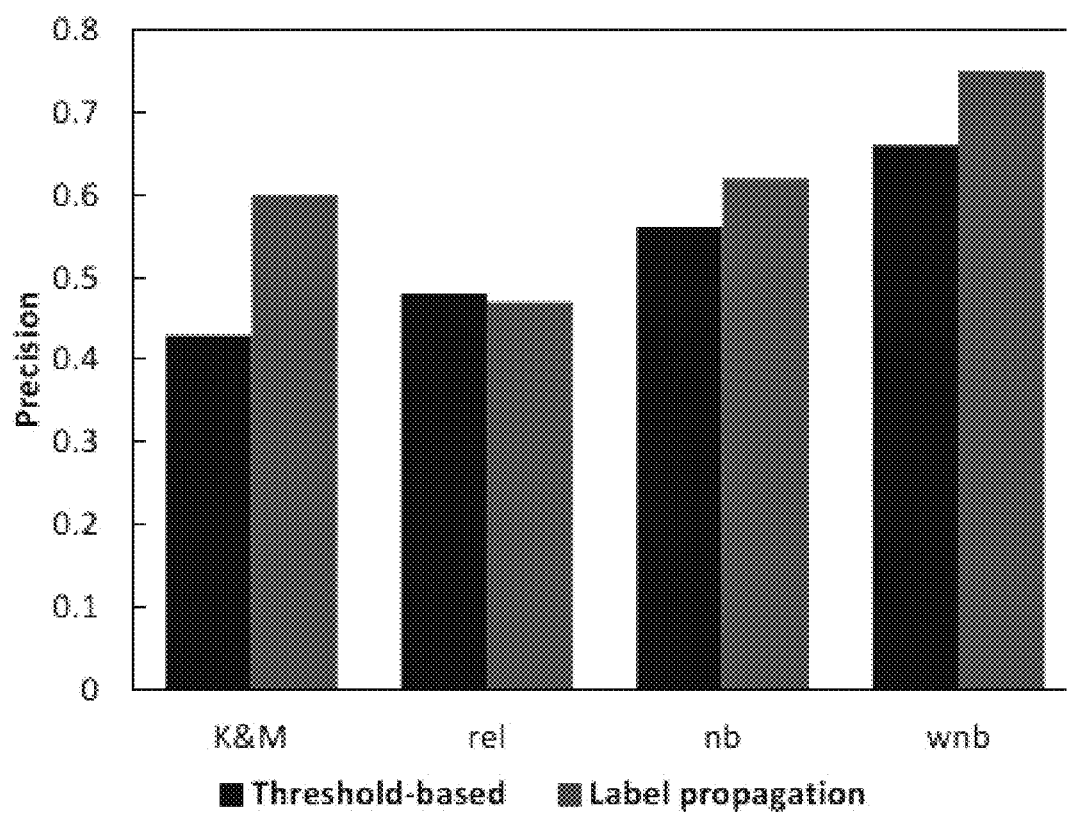
FIG. 9 is a graphical representation showing a comparison between threshold-based and label propagation selection approaches, according to aspects of the present disclosure.

In label propagation selection, a set of users were selected that have a high causality score as seeds, then ProSel selects users that occur with those seeds and have a score higher than a threshold iteratively. Also, the seed set in each iteration is the selected users of the previous iteration. The intuition behind this approach is to select a user if it has a score higher than a threshold or has a lower score but occurs in the cascades that high score users occur. The parameters of ProSel Algorithm are set as follows: $\lambda=0.1$, $\theta=0.9$, except for relative likelihood causality, where we set $\lambda=1$, $\theta=9$. Table XIII shows the performance of each metric. Precision of these metrics varies from 0.47 to 0.75 and $\in_{wnb}$ achieves the highest precision. Metrics $\in_{rel}$ with average cascade size of 612.04 and $\in_{nb}$ with median of 230 find the more important PSM accounts. Moreover, detected PSM accounts have participated in the larger cascades compared with threshold-based selection. This approach also produces much lower number of false positives compared to threshold-based selection. The comparison between this approach and threshold-based selection is illustrated in FIG. 9. From the precision perspective, label propagation method outperforms the threshold-based one.

TABLE XIII

Label propagation selection approach—number of selected users

| Method | False Pos | True Pos | Precision | Avg CS | Med CS |
|---|---|---|---|---|---|
| Allfeat. | 164,012 | 31,131 | 0.16 | 273.21 | 176 |
| NoCont. | 357,027 | 63,025 | 0.15 | 262.97 | 172 |
| $\in_{K\&M}$ | 9,305 | 14,176 | 0.60 | 390.52 | 179 |
| $\in_{rel}$ | 561 | 498 | 0.47 | 612.04 | 216 |
| $\in_{nb}$ | 1,101 | 1,768 | 0.62 | 403.55 | 230 |
| $\in_{wnb}$ | 1,318 | 4,000 | 0.75 | 355.24 | 183.5 |

The number of common users selected by any pair of two metrics is also illustrated in Table XIV. It shows that our metrics are covering different regions of the search area and identifying different sets of users. In total, 10,254 distinct active users and 16,096 inactive ones are selected.

TABLE XIV

Label propagation selection approach -
number of common selected users

| Status | Active | | | Inactive | | |
|---|---|---|---|---|---|---|
| Method | $\in_{rel}$ | $\in_{nb}$ | $\in_{wnb}$ | $\in_{rel}$ | $\in_{nb}$ | $\in_{wnb}$ |
| $\in_{K\&M}$ | 289 | 581 | 1,122 | 168 | 1,019 | 2,788 |
| $\in_{rel}$ | | 15 | 6 | | 180 | 102 |
| $\in_{wnb}$ | | | 151 | | | 833 |

Hawkes Process Approach

The infectivity matrix for both PSM and normal users is estimated by fitting the Hawkes model described earlier. In this study, this matrix characterizes the strength of the connections between platforms and news sources. More specifically, each weight value represents the connection strength from one platform to another. In other words, each entry in this matrix can be interpreted as the expected number of subsequent events that will occur on the second group after each event on the first.

Figure 10:
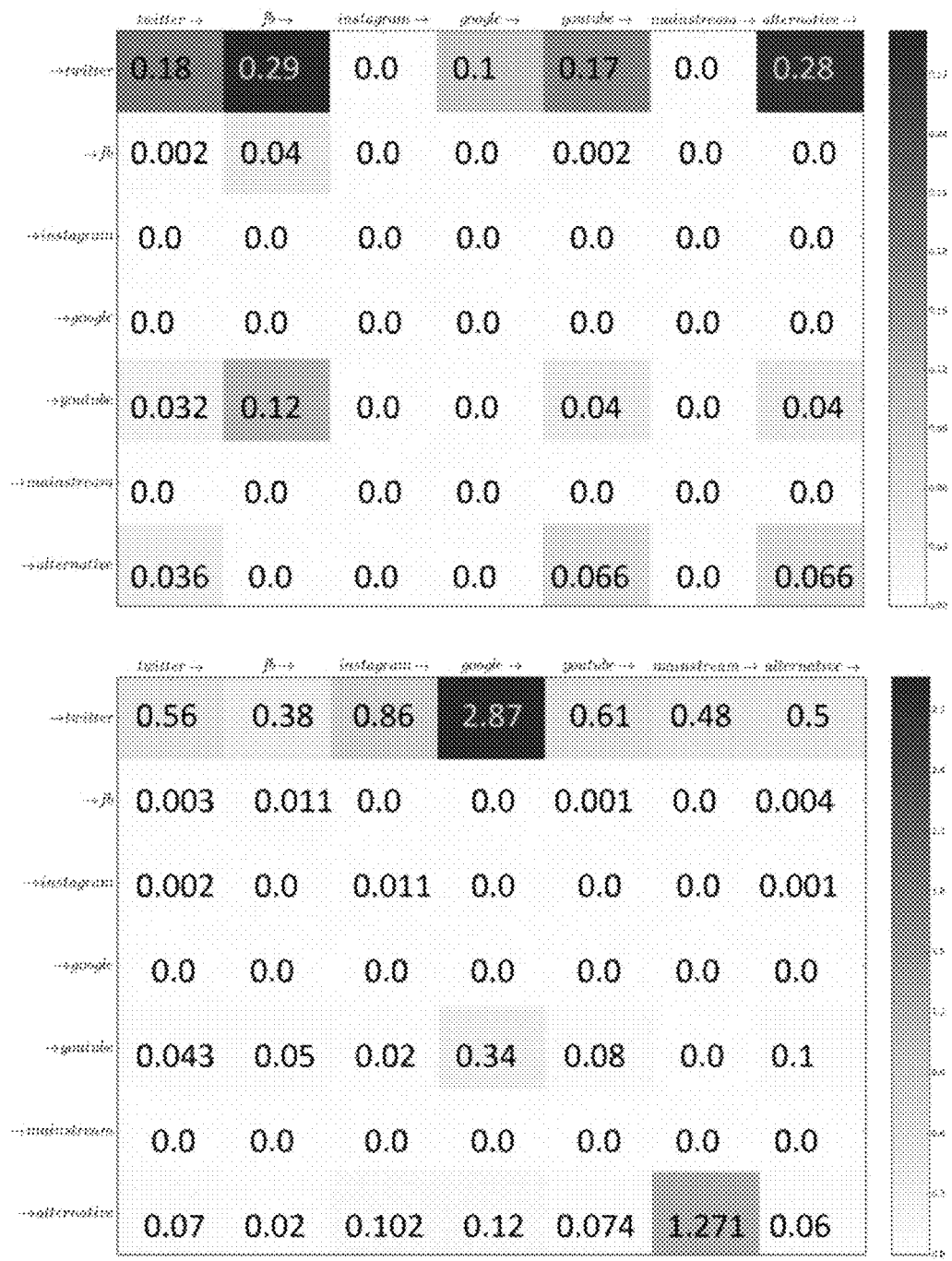
FIG. 10 shows the estimated weights for all paired URLs for (top) PSM accounts, and (bottom) normal users. Among all social media platforms and mainstream and alternative news sources, URLs shared from facebook.com and alternative news media had largest impact on dissemination of malicious messages.

In FIG. 10 the estimated weights for all paired URLs for both PSM and normal users are depicted. The weights in both plots show that greater weights belong to processes that have impact on Twitter, i.e. "→Twitter". This implies that both of the groups in the Twitter dataset often post URLs that ultimately have greater impact on Twitter.

Overall, the following observations can be made:
  URLs references all platforms and posted by the PSMs and regular users mostly trigger URLs that contain the Twitter domain.
  Among all platforms studied here, URLs shared from facebook.com and alternative news media contributed the most to the dissemination of malicious information from PSM accounts. In other words, they had the largest impact on making a message viral and causing the subsequent events.
  Posts that were tweeted by the PSM accounts and contained URLs from facebook.com demonstrated more influence on the subsequent retweets containing URLs from youtube.com, in contrary to the other way around.

This means that ultimately tweets with URLs from Facebook will likely end up inducing external impulse on youtube.com. In contrast, URLs posted by the normal users have nearly the same impact on subsequent events regardless of the social media or news outlet used.

The above mentioned observations demonstrate the effectiveness of leveraging Hawkes process to quantify the impact of URLs posted by PSMs and regular users on the dissemination of content on Twitter. The observations we make here show that PSM accounts and regular users behave differently in terms of the URLs they post on Twitter, in that they have different tastes while disseminating URL links. Accordingly their impact on the subsequent events significantly differ from each other.

Additional Experiments

Additional experiments were conducted to gauge the effectiveness and efficiency (timeliness) of the above approaches that use the causality metrics as features in (1) supervised setting, and (2) for computing proximity scores between users in community detection-based framework.

Experimental Settings

To assess the effectiveness and efficiency of the metrics and the proposed framework in early detection of PSM accounts, we use different subsets of size x % of the entire time-line (from Feb. 22, 2016 to May 27, 2016) of the action log A, by varying x as in {10, 20, 30, 40, 50}. Next, for each subset and each user i in the subset, we compute feature vector $x_i$ of the corresponding 4 causality scores. The feature vectors are then fed into supervised classifiers and the proposed community detection-based algorithm to perform classification. For the sake of fair comparison, both standard and decay-based metrics were performed. For both metrics, we empirically found that p=0.1 and a=0.001 work well. For the decay-based causality metric a sliding window of size of 5 days (i.e. $\delta$=5) and set $\sigma$=0.001 was assumed which were found to work well in the experiments. Note that only results for PSM (suspended) accounts were presented. Among many other supervised classifiers such as ADABOOST, LOGISTIC REGRESSION and SUPPORT VECTOR MACHINES (SVM), RANDOM FOREST (RF) with 200 estimators and 'entropy' criterion, achieved the best performance. Therefore, for brevity only results when RF is used as the classifier was reported. This aligns well with previous results on related problems such as the identification of viral cascades.

The results for the proposed community detection-based framework and both causal and decay-based metrics are presented herein. As stated earlier, for community detection the LOUVAIN algorithm was implemented since it was fast, scaled well and it did not require any parameter tuning. For the second part of the proposed algorithm, i.e., computing k nearest neighbors of each instance and the final labeling procedure, we set k=10 as it was found to work well for our problem. It must be stressed that using KNN alone does not yield a good performance by reporting the results of KNN trained on the decay-based causality features.

For the sake of fair comparison, all approaches were implemented and run in Python 2.7x, using scikit-learn package. For the Louvain algorithm, we used the Python community detection package was used. For any approaches that required special tuning of parameters, a grid search was conducted to choose the best set of parameters.

Baseline Methods

To validate the performance of the proposed metrics and framework, the metrics and framework were compared against the following state-of-the-art baselines:

CAUSAL (Anonymous 2017). The proposed decay-based metrics was benchmarked against causal metrics (Anonymous 2017) via both supervised and community detection-based settings.

SentiMetrix-D$_{BSCAN}$ (Subrahmanian et al. 2016). This method was the winner of the DARPA Twitter bot challenge contest (Subrahmanian et al. 2016). This baseline deploys several features including tweet syntax (average number of hashtags, average number of user mentions, average number of links, average number of special characters), tweet semantics (LDA topics), and user behavior (tweet spread, tweet frequency, tweet repeats). For this baseline, a 10-fold cross validation was performed and use a held-out test set for evaluating the baseline. This baseline then uses a seed set of 100 active and 100 inactive accounts, and then use D$_{BSCAN}$ clustering algorithm to find the associated clusters of users. The available labels are then propagated to nearby unlabeled users in each cluster based on the Euclidean distance metric, and the labels of the remaining accounts are predicted using SVM.

SentiMetrix-RF. This is a variant of the previous baseline where we excluded the D$_{BSCAN}$ part and instead trained RF classifier using only the above features to evaluate the feature set.

Identification of PSM Accounts

For evaluating how accurate different approaches are in identifying PSM accounts, we use different metrics including precision, recall and F-1 measure and area under curve (AUC) for the PSM accounts. Precision, recall, F1-score and AUC results for each method are shown in FIGS. 14A-14B and 15A-15B. Note for each subset, independent from other subsets, a 10-fold cross validation was performed. The following observations were made.

- Community detection-based framework achieved the best performance in terms of several metrics used. This aligns well with the t-test results discussed earlier, meaning that taking into account community structure of PSM accounts can boost the performance.
- For the most part, the causal and decay-based metrics achieved higher classification performance than other approaches via both settings.
- Decay-based metrics are effective at identifying PSM accounts at different time points via supervised and community detection-based settings. It is posited that this lies at the inherent difference between decay-based and causal metrics-decay-based metrics take into account time-decay effect while computing the causality scores.
- Although SENTIMETRIX-D$_{BSCAN}$ and SENTIMETRIX-RF take advantage of several features, they were unable to defeat our approach. It is noted that most of the features used in these baselines are based on content of tweets which is not always readily available.

Timeliness of PSM Accounts Identification

The following experiment was conducted to gauge the ability of different approaches in identifying PSM accounts around their activity. For each approach, it was determined how many of the PSM accounts were active in the first 10 days of the dataset, were correctly classified (i.e., true positives) over time. Also, the framework needed to keep track of false positives to ensure a given approach does not merely label each instance as positive—otherwise a trivial approach that always would label each instance as PSM would achieve the highest performance. In addition, to figure how many days were needed to find these PSM accounts each classifier was trained using 50% of the first portion of the dataset. A held-out set was used for the rest for evaluation. Next, the misclassified PSM accounts were passed on to the next portions to see how many of them can be captured over time. The process was repeated until reaching 50% of the action log—each time the training set was increased by adding new instances from each portion.

There are 14,841 users in the first subset from which 3,358 users are PSM. Table XV below shows the number of users from the first portion that (1) are correctly classified as PSM (out of 3,358), (2) are incorrectly classified as PSM (out of 29,617), over time. According to this table, community detection-based approaches were able to detect all PSM accounts who were active in the first 10 days of our dataset, in about a month since their first activity. In particular, DECAY-$C^2$DC, identified all of these PSM accounts in about 20 days since the first time they posted a message. Also, both causal and decay-based metrics when fed to RF classifier, identified all of the PSM accounts in the first period. SENTIMETRIX-DBSCAN and SENTIMETRIX-RF failed to detect all PSM accounts from the first portion, around the first 50 days of their activity. Furthermore, these two baselines generated much higher rates of false positives compared to all of the causality-based approaches.

Figures 16A, 16B:
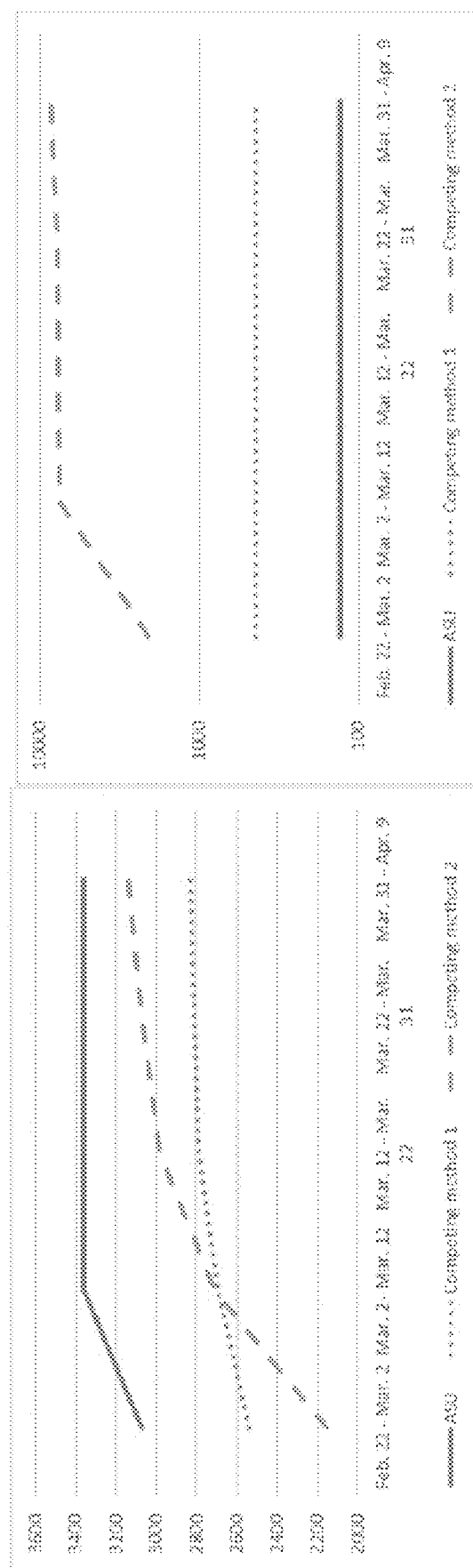
FIGS. 16A-16B show cumulative true positives and false positives based on the available training data.

Further comparisons with existing methods were made to to evaluate for true positives and false positives over time. FIGS. 16A and 16B show cumulative true positives and false positives based on the available training data. True positives (FIG. 16A) are more rapidly identified by the PSM Account Detection compared to existing approaches, and is the only approach to identify all pathogenic accounts. Likewise, it also maintains the lowest false positive rate by a significant margin (FIG. 16B).

Figure 17:
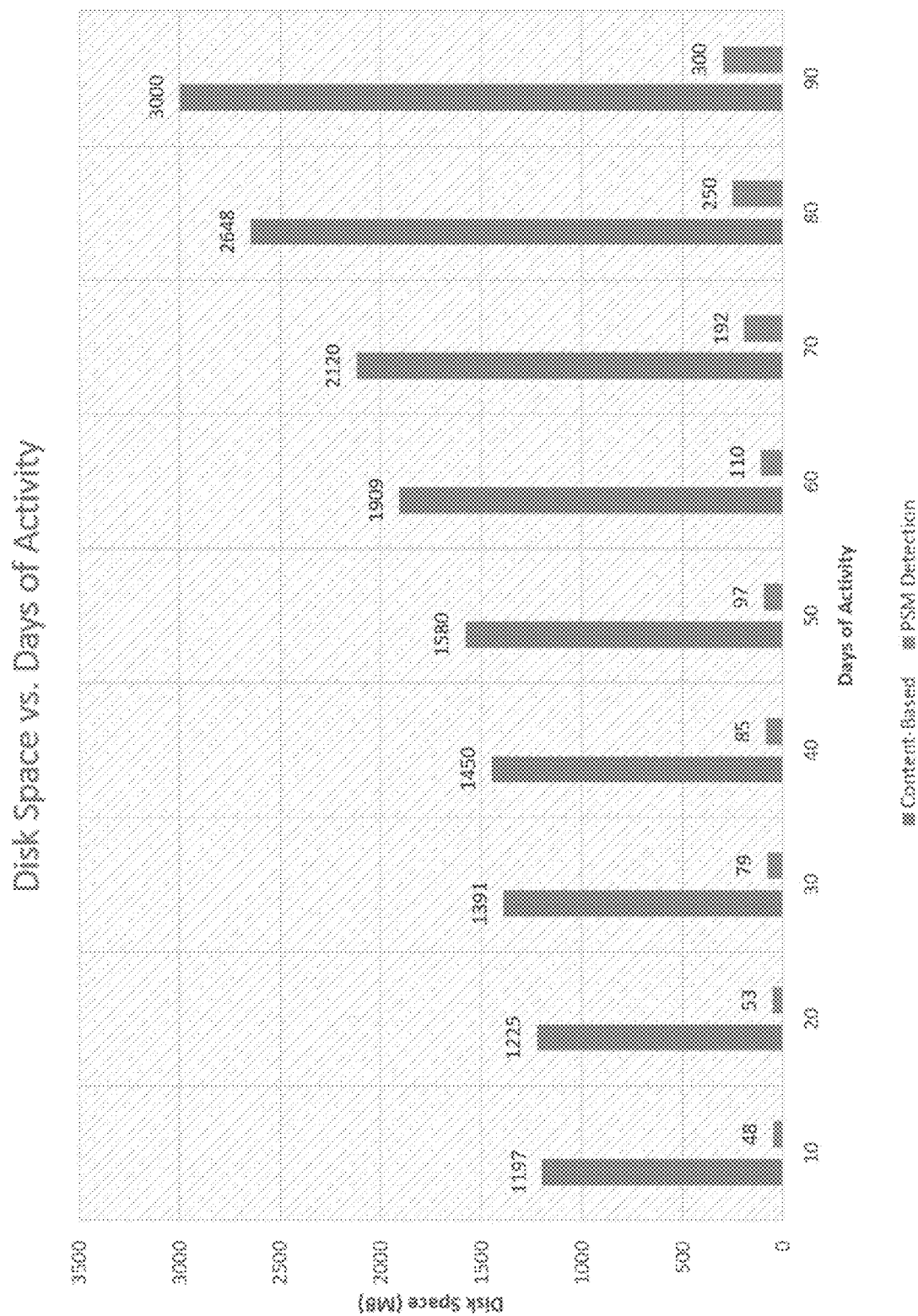
FIG. 17 compares diskspace requirements from existing approaches due to content storage as opposed to specifications according to embodiments of the present novel concept, which primarily uses action logs.

Finally, as discussed, existing approaches for detecting socialbots and other malicious actors on social media are highly dependent upon content—which leads to a dramatic increase in disk space and RAM requirements. FIG. 17 compares diskspace requirements from existing approaches due to content storage as opposed to requirements to this invention, which primarily uses action logs. The substantial reduction in storage requirements enables a significant reduction in computing machinery overhead enabling the approach to be scaled in order to detect a larger number of malicious actors on social media. The reductions are by an order of magnitude and highly significant by any standard statistical measure.

TABLE XV

| | # of True Positives/False Positives | | | | | |
| --- | --- | --- | --- | --- | --- | --- |
| Learner | Feb 22-Mar 2 | Mar 2-Mar 12 | Mar 12-Mar22 | Mar 22-Mar 31 | Mar 31-Apr 9 | # of Remaining |
| DECAY-$C^2$DC | 3,072/131 | 286/0 | 0/0 | 0/0 | 0/0 | 0 |
| CAUSAL-$C^2$DC | 3,065/156 | 188/20 | 105/0 | 0//0 | 0/0 | 0 |
| DECAY-KNN | 3,108/459 | 427/234 | 315/78 | 109/10 | 96/0 | 213 |
| DECAY-RF | 2,472/307 | 643/263 | 145/11 | 72/68 | 28/0 | 0 |
| CAUSAL-RF | 2,398/441 | 619/315 | 221/169 | 80/70 | 51/0 | 0 |
| SENTIMETRIC-RF | 2,541/443 | 154/0 | 93/0 | 25/0 | 11/0 | 511 |
| SENTIMETRIX-DBSCAN | 2,157/2,075 | 551/5,332 | 271/309 | 92/118 | 72/696 | 215 |

The observations that were made aligned well with previous observations; suggesting that the community detection-based framework yields higher classification performance than other frameworks. Finally, it should be noted that to make the computations and discussion less complicated, a period of 10 days was used, therefore, the exact number of days that should pass were not known, although this will still give a good approximation of the efficiency of the given approach in early identification of PSM accounts.

Blind Validation Tests for PSM Account Detection

Blind validation tests were conducted by a third party using real social media data that the third party used for other products and services. In the test, the third party provided data without ground truth, for which results were provided in return. The third party provided performance metrics compared with an existing approach for identifying social bots. It should be noted that the evaluated version of the PSM Account Detection software was the initial version. The version disclosed has shown improved performance.

TABLE XVII

Results of the blind validation tests

| | PSM Account Detection | Existing approach from third party |
| --- | --- | --- |
| Accounts identified as social bot, suspended or offline | 51 | 10 |
| False positives identified as "self-promoters" | 6 | (not reported) |
| Other false positives | 10 | (not reported) |

Figure 18:
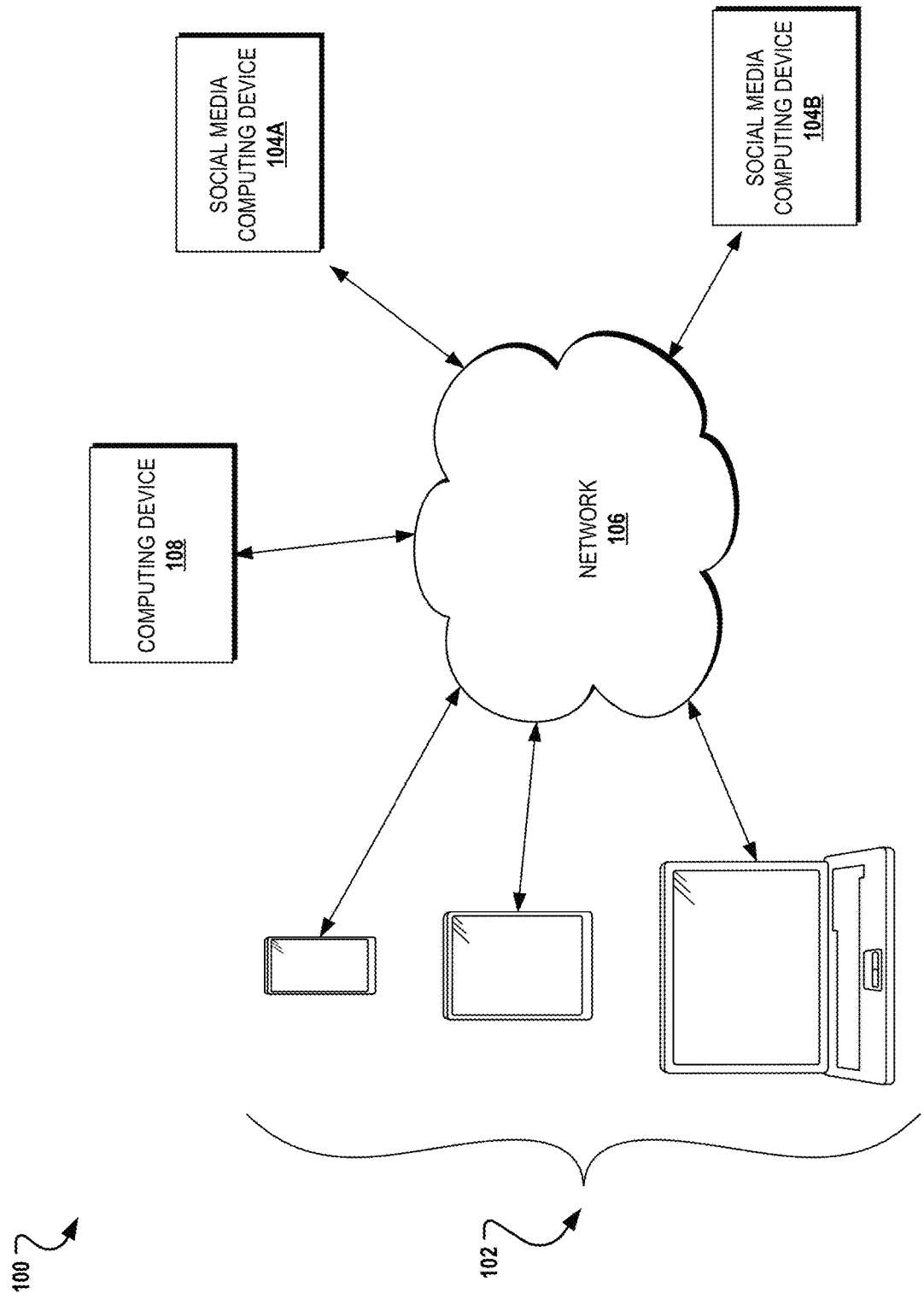
FIG. 18 is a network diagram for illustrating generation of the social media data described herein, according to aspects of the present disclosure.

Turning to FIG. 18, an example network environment 100 for generating the social media data ultimately utilized to detect PSM accounts as described herein is shown. The network environment 100 may include a plurality of user devices 102, and a plurality of social media computing devices, designated 104A and 104B. User devices 102 may be associated with users of social media located throughout the world, and the social media computing devices 104A-104B may be associated with social media providers such as e.g. Twitter, Facebook, news websites, and the like. The user devices 102 may request and submit content to the social media computing devices 104A-104B using a network 106 (e.g. the Internet) as indicated. Specifically, the user devices 102 may adopt various messages as defined herein hosted or otherwise provided by the social media computing devices 104A-104B. For example, any one of the user devices 102 may log on to a social media application hosted by the social media application server 104A, and broadcast or re-broadcast a message such as a video, text message, audio file, or the like.

The user devices 102 may be generally any form of computing device capable of interacting with the network 106 to access a social media website, such as a mobile device, a personal computer, a laptop, a tablet, a workstation, a smartphone, or other Internet-communicable device. The social media computing devices 104A-1046 may include computing devices configured for providing social media websites or aspects thereof and/or any applications or websites where a user may adopt a social media message, and may be implemented in the form of servers, workstations, terminals, mainframes, storage devices, or the like.

As further shown, a computing device 108 may be communicably coupled to the network 106. The computing device 108 may be implemented to provide the functionality described herein, and may include a laptop, desktop computer, server, or other such computing device. Any one of the social media computing devices 104A-B or the computing device 108 may include at least one server hosting a website or providing an application. Such a server (not shown) may be a single server, a plurality of servers with each such server being a physical server or a virtual machine, or a collection of both physical servers and virtual machines. In another implementation, a cloud hosts one or more components of the network environment 100. In this implementation, the user devices 102, any servers, and other resources connected to the network 106 may access one or more servers to access websites, applications, web services, interfaces, storage devices, computing devices, or the like.

Figure 19:
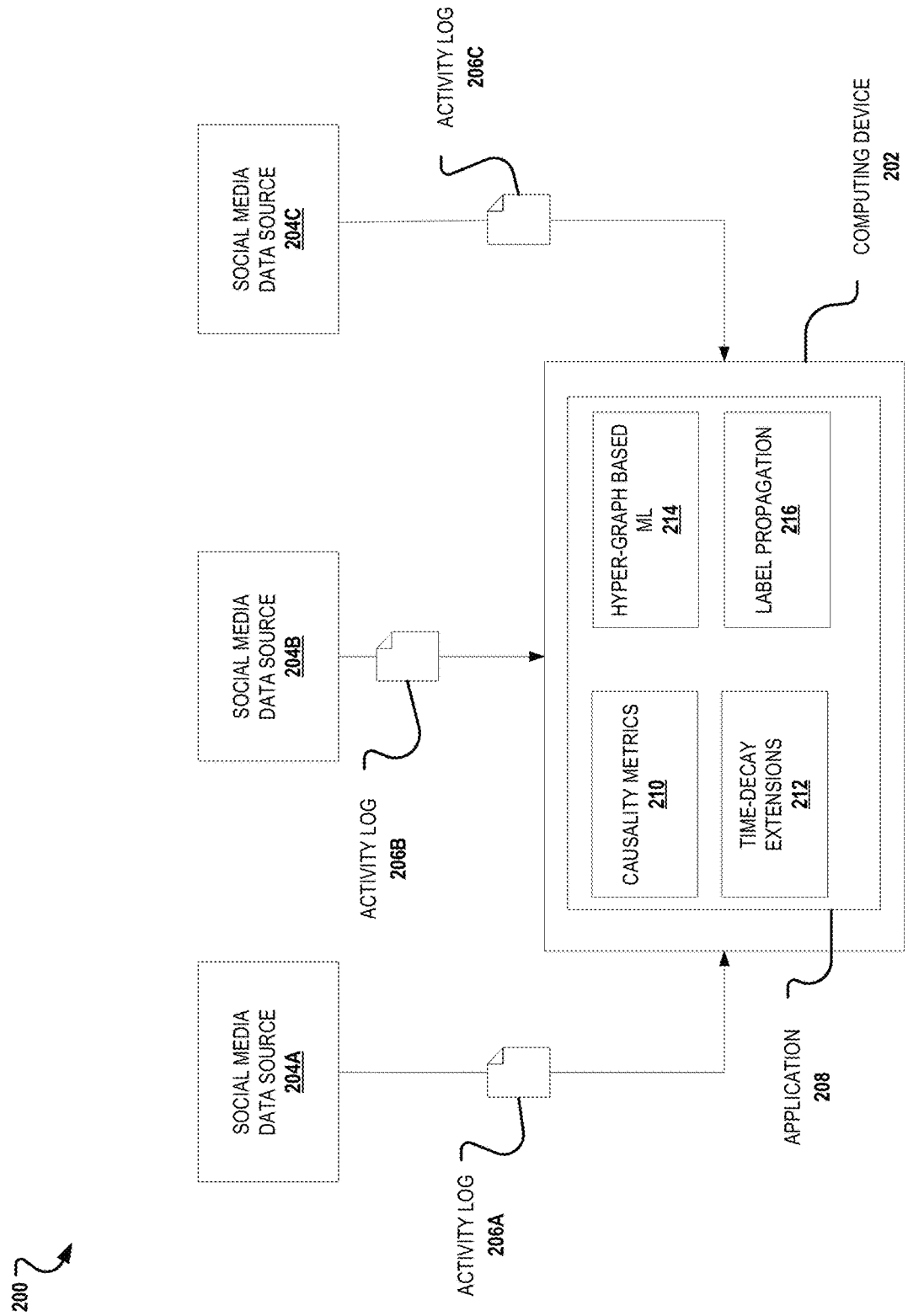
FIG. 19 is a system diagram illustrating one possible non-limiting embodiment for transforming the social media data generated in FIG. 18 to causality values for detecting PSM accounts using the novel methods and functionality described herein, according to aspects of the present disclosure.

Referring to FIG. 19, with reference to the process flow 300, further details regarding the implementation of the functionality described herein relative to the network environment 100 are illustrated. In the system diagram 200, a computing device 202 is shown which may be similar to the computing device 108 of the network environment 100 such that the computing device 202 may access user devices 102 and social media computing devices 104A-B. In particular, the computing device 202 is configured to access social media data in the form of activity logs 206A-206C from one or more social media data sources 204A-204C. The computing device 202 may access such information via e.g. the network 106, or locally, and may access the data directly from social media providers (e.g. the social media computing devices 104A-B) or third party providers of such information. In other words, the social media data sources 204A-204C may include databases or storage devices associated with the social media computing devices 104A-B, or may include third party storage repositories. For example, the social media data source 204A may include Twitter data purchased through a third party, or, the social media data source 204A may include a storage device associated with Twitter directly.

Figure 20:
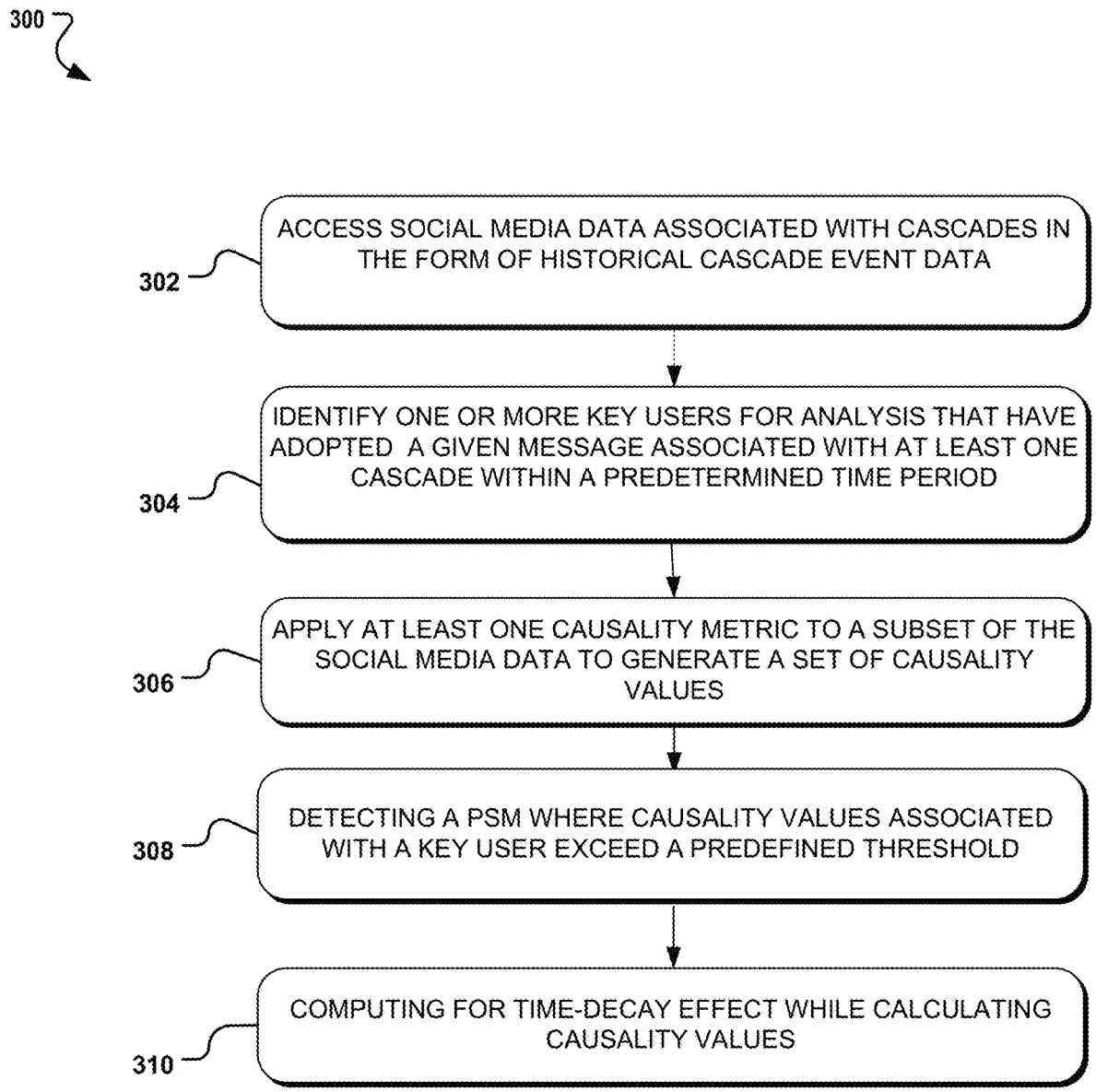
FIG. 20 is a process flow illustrating possible steps of implementing the functionality described herein and shown in FIG. 19, according to aspects of the present disclosure.

The process flow 300 of FIG. 20 shall now be described to illustrate further aspects of FIG. 19. Referring to block 302, in order to determine the causality of one or more key users with respect to cascades, social media data associated with cascades, in the form of the activity logs 206A-206C or other such historical cascade event data, may be accessed by the computing device 202 from any one or more of the social media data sources 204A-204C. The social media data may define a message associated with a cascade, which may include a video, a tweet, a news posting, a Facebook like, or any other form of social media that a user may adopt, broadcast/rebroadcast, or otherwise interact with. The data from the activity logs 206A-206C may define tuples, which may be used as input parameters to be applied to causality metrics as described herein. In some embodiments, the activity logs 206A-206C include a User ID, a message ID, and a timestamp.

Referring to block 304, one or more key users may be identified for analysis. Key users may be defined as users of social media that interact with a cascade or adopt a social media message at an early stage; e.g., within a predetermined timeframe. Key users may be associated with social media user profiles that include at least a name, a possible photo, a URL, and a number of posts/tweets/retweets or other information indicating adoption behavior associated with the user profile, and location.

Referring to block 306, with continuing reference to diagram 200, a subset of the social media data accessed in block 302, associated with the key users, may be applied to one or more causality metrics. Specifically, in some embodiments, the computing device 202 may be configured with at least one application 208, which may define a plurality of modules as defined herein suitable for executing the functionality described herein, i.e. applying causality metrics 210 (as described in Table 3 above) to the data. Using the social media data, the application 208 generates a set of causality values for one or more key users. As shown in block 308, a PSM account may be detected where the causality value of a given key user exceeds a predefined threshold. As further shown, and referenced in block 310, the application 208 may include or otherwise be configured to implement time-decay extensions 212, hyper-graph based machine learning (ML) 214, and label propagation 216 to further define the data.

Figure 21:
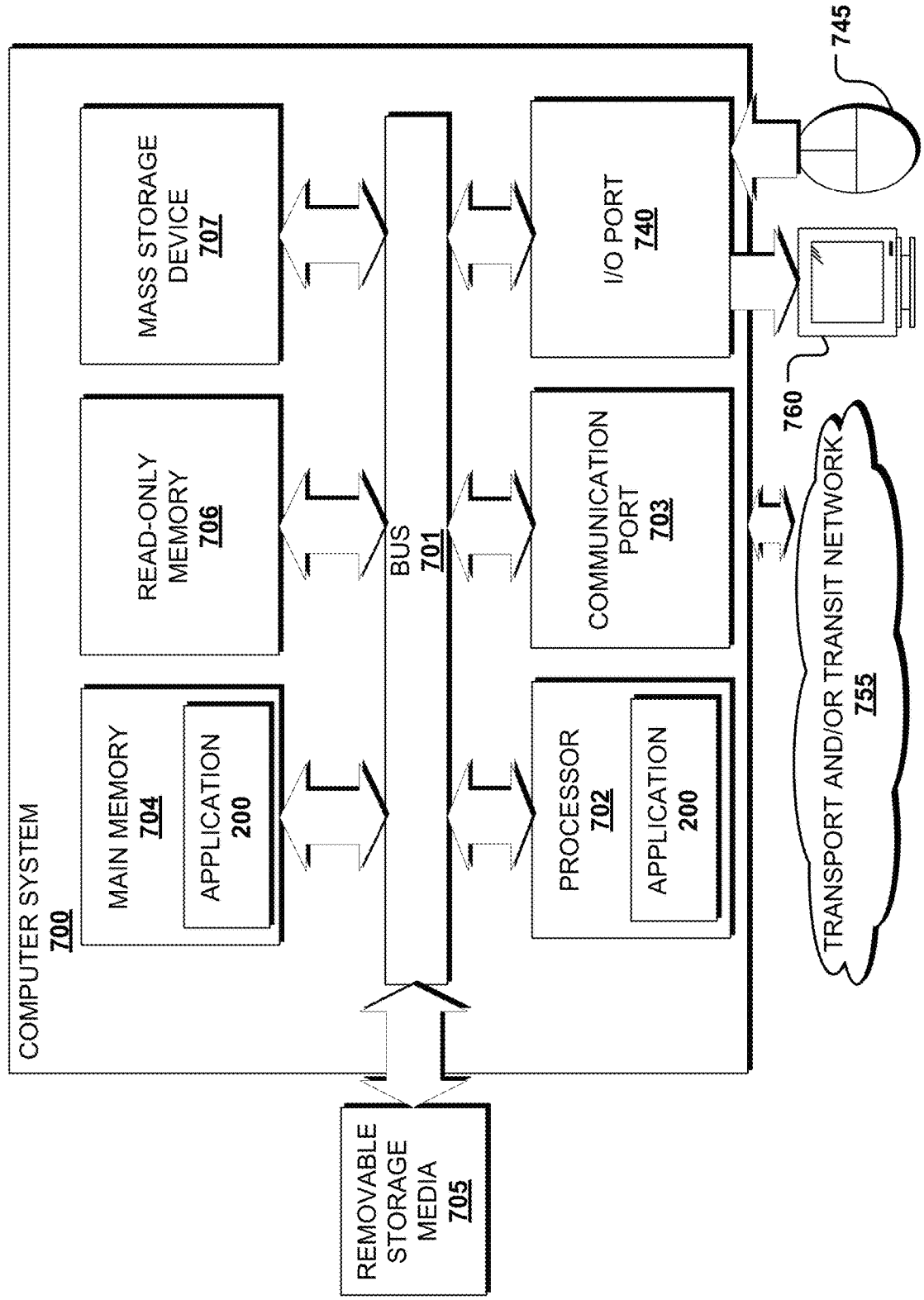
FIG. 21 is a schematic diagram of a non-limiting computing system for implementing the functionality described herein, according to aspects of the present disclosure.

FIG. 21 is an example schematic diagram of a computing system 700 that may implement various methodologies discussed herein. For example, the computing system 700 may comprise a server used to execute aspects of the application 208. The computing system 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computer system 700 connects. Computing system may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 may be encoded with the application 208 that supports functionality discussed herein. In other words, aspects of the application 208 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret or otherwise perform processes, such as through logic instructions, executing on the processor 702 and based on the application 208 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Certain embodiments are described herein as being implemented via one or more applications that include metrics which may collectively define modules. Such modules may be hardware-implemented, and may thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" or "module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method of detecting pathogenic social media accounts, comprising:
utilizing a processor in communication with a tangible storage medium storing instructions that are executed by the processor to perform operations comprising:
accessing data associated with a social media message adopted by a plurality of users during a predetermined time period, the data defining a cascade associated with the social media message;
identifying one or more key users from the plurality of users, the one or more key users having adopted the social media message before a predetermined number of the plurality of users;
applying at least one causality metric to a subset of the data associated with the one or more key users to generate a set of causality values, wherein the set of causality values reflect causality associated with the cascade as exhibited by the one or more key users; and
detecting a pathogenic social media account where the set of causality values associated with the one or more key users exceeds a predefined threshold, whether the one or more key users are associated with the pathogenic social media account such that the set of causality values determines how likely the one or more key users are to make the social media message go viral.

2. The method of claim 1, further comprising:
identifying a first user from the one or more key users, the first user having adopted the social media message before the predetermined number of the plurality of users; and
identifying a second user from the one or more key users, the second user having adopted the social media message subsequent to the first user and the second user being related to the first user.

3. The method of claim 2, wherein the cascade defines an action log of a plurality of tuples associated with the plurality of users where each of the plurality of tuples represents when the social media message is adopted such that (u, m, t)∈Actions, wherein
u denotes a respective user of the plurality of users adopting the social media message, wherein the social media message is denoted as m and wherein t denotes the predetermined time period.

4. The method of claim 3, further comprising determining that the first user designated i precedes the second user designated j in the cascade where t<t' and where (i, m, t), (j, m, t')∈Action, wherein t' denotes a time after t where the user j reposts the social media message m.

5. The method of claim 2, further comprising:
(i) measuring a first probability that a size of the cascade meets a predetermined threshold given the first user adopts the social media message before the second user,
(ii) measuring a probability that the size of the cascade meets the predetermined threshold where the first user does not adopt the social media message before the second user, and
computing an average value of difference between (i) and (ii).

6. The method of claim 2, further comprising analyzing the cascade without influence by the first user to further assess the causality for the cascade as exhibited by the first user.

7. The method of claim 1, wherein the at least one causality metric includes a Kleinberg-Mishra causality metric.

8. The method of claim 1, wherein the social media message was adopted when a user tweeted the social media message, retweeted the social media message, posted the social media message, liked the social media message, or viewed the social media message, and further wherein the social media message includes one or more of a text, a picture, a video, audio, a URL or link to a website, or a hashtag.

9. The method of claim 1, further wherein the social media message is adopted by the plurality of users a predetermined number of times.

10. The method of claim 1, further comprising:
wherein the processor is configured to determine if the pathogenic social media account is active, wherein active indicates that the pathogenic social media account has not been suspended or deleted.

11. The method of claim 1, wherein the predetermined number of the plurality of users' actions is 10%, 20%, 30%, 40%, or 50%.

12. The method of claim 1, wherein the predetermined time period is at least 2 weeks.

13. The method of claim 1, further comprising representing each of the one or more key users by a causality vector computed by the at least one causality metric, wherein
the causality vector defines a set of causality values computed for each of the one or more key users computed in a temporal environment or fashion using time-decay properties.

14. The method of claim 1, further comprising:
assigning different time points to the predetermined time period; and
assigning different weights to the set of causality values computed for the one or more key users, the different weights inversely proportional to distances from a given time associated with the predetermined time period.

15. The method of claim 14, further comprising:
utilizing a sliding-time window to divide the predetermined time period into intervals;
deploying an exponential decay function to account for a time-decay effect, wherein
the exponential decay function accounts for a timely update of causality scores for each user, by, given a casualty vector x of each user as input, outputting a decayed version or changing over time causality computed for the each user; and
computing an average between the set of causality values computed using the sliding-time window.

16. A system, comprising:
a computing device, configured to:
access data associated with a social media message adopted by a plurality of users during a predetermined time period, the data defining a cascade associated with the social media message,
identify one or more key users from a plurality of users, the one or more key users having adopted the social media message before a predetermined number of the plurality of users;
apply at least one causality metric to a subset of the data associated with the one or more key users to generate a set of causality values, wherein the set of causality values reflect causality associated with the cascade as exhibited by the one or more key users; and
detect a pathogenic social media account where the set of causality values associated with the one or more key users exceeds a predefined threshold, whether the one or more key users are associated with the pathogenic social media account such that the set of causality values determines how likely the one or more key users are to make the social media message go viral.

17. The system of claim 16, wherein the computing device is further configured to access a set of URLs associated with an action log of the plurality of users associated with cascades.

18. The system of claim 17, wherein the computing device is further configured to apply a form of multi-dimensional point process to the set of URLs to estimate an influence of nodes associated with the plurality of users.

19. The system of claim 18, wherein the multi-dimensional point process is a Hawkes process.

* * * * *